(12) United States Patent
Ning

(10) Patent No.: US 9,307,128 B2
(45) Date of Patent: Apr. 5, 2016

(54) LENS MOUNT

(71) Applicant: Alex Ning, Carlsbad, CA (US)

(72) Inventor: Alex Ning, Carlsbad, CA (US)

( * ) Notice: Subject to any disclaimer, the term of this patent is extended or adjusted under 35 U.S.C. 154(b) by 143 days.

(21) Appl. No.: 14/017,497

(22) Filed: Sep. 4, 2013

(65) Prior Publication Data

US 2014/0002676 A1 Jan. 2, 2014

Related U.S. Application Data

(63) Continuation-in-part of application No. PCT/US2012/044236, filed on Jun. 26, 2012.

(51) Int. Cl.
*H04N 5/225* (2006.01)
*H04N 5/232* (2006.01)
*G03B 17/14* (2006.01)
*G02B 7/14* (2006.01)
*G03B 1/00* (2006.01)
*G02B 7/00* (2006.01)

(52) U.S. Cl.
CPC ............... *H04N 5/2254* (2013.01); *G02B 7/14* (2013.01); *G03B 17/14* (2013.01); *H04N 5/2257* (2013.01); *H04N 5/23209* (2013.01); *G02B 7/003* (2013.01); *G03B 1/00* (2013.01)

(58) Field of Classification Search
None
See application file for complete search history.

(56) References Cited

U.S. PATENT DOCUMENTS

| 6,762,796 | B1 | 7/2004 | Nakajoh et al. | |
|---|---|---|---|---|
| 6,930,721 | B2 | 8/2005 | Gelbard | |
| 7,126,111 | B2 | 10/2006 | Webster | |
| 2003/0137595 | A1 | 7/2003 | Takachi | |
| 2003/0206352 | A1 | 11/2003 | Mihara et al. | |
| 2005/0104995 | A1* | 5/2005 | Spryshak | G02B 7/026 348/360 |
| 2006/0139774 | A1 | 6/2006 | Pfnuer et al. | |
| 2007/0077051 | A1* | 4/2007 | Toor | G02B 7/04 396/144 |
| 2007/0116452 | A1* | 5/2007 | Aoki | G02B 13/0035 396/144 |
| 2007/0280677 | A1 | 12/2007 | Drake et al. | |
| 2008/0143864 | A1 | 6/2008 | Yamaguchi et al. | |
| 2008/0198254 | A1 | 8/2008 | Nagasaki | |
| 2009/0046201 | A1* | 2/2009 | Kastilahn | G02B 7/021 348/375 |
| 2010/0103540 | A1* | 4/2010 | An | G02B 7/021 359/819 |
| 2011/0043687 | A1* | 2/2011 | Chang | H01L 27/14618 348/374 |
| 2011/0063496 | A1* | 3/2011 | Chang | H04N 5/2251 348/360 |
| 2011/0075021 | A1* | 3/2011 | Chang | G02B 7/022 348/374 |
| 2011/0304931 | A1* | 12/2011 | Kuo | G02B 13/001 359/819 |
| 2012/0019940 | A1* | 1/2012 | Lu | G02B 7/025 359/819 |
| 2015/0130941 | A1* | 5/2015 | Bauer | G03B 17/12 348/148 |

\* cited by examiner

*Primary Examiner* — Justin P Misleh
(74) *Attorney, Agent, or Firm* — Mark Wisnosky

(57) ABSTRACT

A lens mount design is presented. The mount can be used on a variety of imaging systems but is targeted at small camera systems such as might be used on mobile phones, cameras, sports cameras, computers and computer peripherals where interchangeable lenses are currently not common place. Embodiments include different attachment mechanisms, environmental barriers, electrical connections, a serial number marking system on the replaceable lens body and methods for using the lens mount and system.

6 Claims, 39 Drawing Sheets

LENS MOUNT

CROSS-REFERENCE TO RELATED APPLICATIONS

This application is a continuation in part of U.S. PCT Application PCT/US12/44236, titled: Lens Mount, filed Jul. 26, 2012, by the same inventor and currently pending.

BACKGROUND OF THE INVENTION

1. Technical Field

The present invention relates to an interchangeable lens mounting system for compact camera systems and other applications.

2. Related Background Art

Digital imaging cameras use solid-state image sensors such as CCD or CMOS imagers to convert optical images into electronic signals. As the resolution of the imagers increases, there is a continuous need for optical lenses with increased performance. An important characteristic of the lens is the ability to produce high-resolution images across a wide field of view. Another important characteristic is to produce such high-resolution images using a lens that is of a compact size. The lenses are increasing being incorporated into a variety of electronic devices including mobile phones, cameras, sports cameras, computers and computer peripherals. Incorporation of the lenses into new devices also places new environmental performance requirements upon the lens. The lens must be compact and light, to be used in portable devices, and must maintain high performance characteristics. Multi-megapixel cameras incorporated in such devices have become commonplace. The performance must be stable with respect to vibrations and movement. The lens should also be made where possible of lightweight materials. The lenses should also be compact in both the axial as well as the longitudinal dimensions of the lens.

Inter-changeable lens mounting systems are standard features on traditional film and digital SLR cameras. They provide a convenient way for end-users to inter-change lenses. Wide-angle lenses may be used for example to capture landscape scenes, medium focus for portraits and telephoto lenses for wildlife and sports photography. Interchangeable lenses allow the user to adapt one camera body to multiple purposes. Currently known security cameras also use inter-changeable lens mount systems such as C-mount or CS-mounts. Though these existing systems work well for large lenses, they are not suited for miniature lenses used on compact cameras utilizing small format CCD/CMOS imaging sensors. The current systems also are not designed for rapid interchange of lenses in the field during use. Demands upon an interchangeable lens system include providing a lens mounting system that can be rapidly interchanged and still maintains precise alignment between the lens focal plane and the sensor image plane when the lenses are inter-changed.

Miniature lenses are often used in extreme environments. Use in sports such as skiing, kayaking and others where moisture contamination is a threat is common. A lens mounting system is needed that provides an environmental seal between the lens body and the lens holder.

Frequently, the image sensors or cameras use different settings depending upon the lens or application. Examples would be color balance, shutter speed, gain, aperture settings and autofocus settings. A lens mounting system is needed that provides a set of lens orientation independent electrical contacts between the lens body and lens holder.

DISCLOSURE OF THE INVENTION

A lens mount system is described that addresses the aforementioned deficiencies in the prior art. The lens mount comprises a lens fixed in a lens body. The lens body includes a flange surface having a reference surface precisely located relative to the focal plane of the lens. The lens may be made of a single element or multiple lens elements. The term lens in the remainder of this description refers generally to either a single or multiple element lenses. The lens elements may be fixed or may be movable relative to one another within the lens body and movable relative to the focal plane as would be the case in a zoom lens or a lens that has an adjustable focus. Embodiments of the invention also include a lens holder. The lens holder is located in the proximity of the sensor with a reference surface that is precisely located relative to the sensor image plane. When the lens body is installed onto the lens holder, the reference surface of the lens holder is aligned with the reference surface of the lens body thus ensuring alignment and accurately defined distance between the lens and the image sensor. The term "alignment" means precise registration or placement of two objects in three dimensions with respect to x, y, z coordinates and rotations of the objects about these three axis. Embodiments use physical contact between the reference surfaces to provide the required precision alignment between the lens focal plane and the sensor image plane. In other embodiments the reference surfaces further include reference points to provide the required relative placement and alignment. In one embodiment the reference points are comprised of spring-loaded spheres such that the contact of threes spheres with a reference surface defines a reference plane. In other embodiments the spheres are replaced with hemispheres, sections of spheres and other geometric shapes that allow point contact. In another embodiment the reference points are machined raised areas or bulges that again when contacting a second surface, define a reference plane. In another embodiment the mating reference points comprise an indentation and a corresponding bump or spring loaded sphere (or other shape as discussed above) provide both planar alignment between surfaces as well as rotational orientation reference points. In another embodiment the alignment points provide planar alignment between the focal plane of the lens and the image plane of the sensor as well as rotational orientation to align electrical contacts located on the lens body and the lens holder. Mechanical or magnetic retaining features are used to secure the lens in place. A seal in the form of an O-ring or gasket made from suitable materials is located between the lens body and lens holder to provide environmental protection against dust/water from entering the space between lens body and the optical image sensor. A set of lens orientation independent electrical contacts between the lens body and lens holders is also provided.

The lens mounting system of the present invention comprises a series of inter-changeable lens bodies all having a flange and a reference surface or a set of reference points precisely located relative to the focal planes of the lens. A lens holder located in the proximity of the sensor and a reference surface or a set of reference points that are precisely located relative to the sensor image plane. When the lens body is installed onto the lens holder, the reference surfaces on the two parts make physical contact to provide precision alignment between the lens focal plane and the sensor image plane.

MODES FOR CARRYING OUT THE INVENTION

Figure 1:
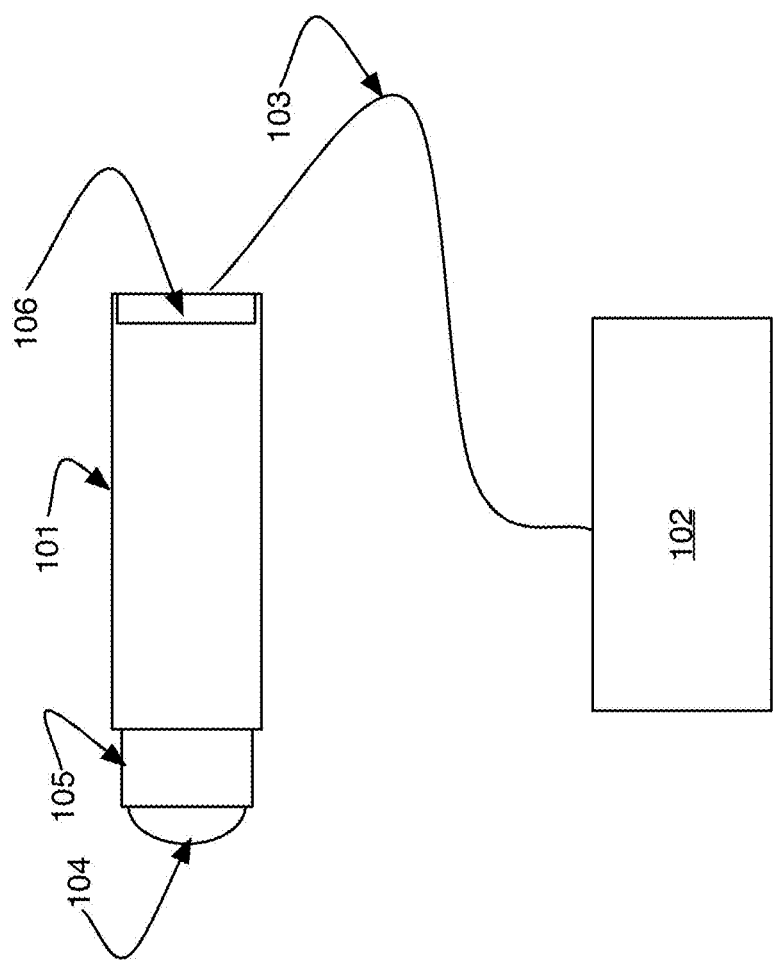
FIG. 1 is a schematic view of an imaging system in which the invention might be practiced.

Referring to FIG. 1 an exemplary imaging system in which the present invention may be used is shown. A lens 104 is mounted in a lens body 105 that is then mounted in a lens holder 101. The lens holder is attached to an image sensor 106. The sensor is typically mounted on a printed circuit board that provides means for an electrical connection 103 to image processing electronics 102. In another embodiment, not shown, the electronics 102 are incorporated on the same circuit board as the image sensor 106 thereby providing a very compact design.

Preferred embodiments of the invention include two general components a lens body and a lens holder. The lens body is removable from the lens holder and may be interchanged with other lens bodies to provide a means for interchanging lenses. Lens bodies contain lens elements that are best used in differing imaging environments. For example one lens body may contain lens elements producing a wide-angle view and a second lens body may contain lens elements providing a telephoto view and a third lens body may contain lens element that are useful for very close-up or what is commonly known as macro imaging. An element of the invention is the ability to interchange these different lens bodies on the same imaging system. The lens holder is a component that acts as an adapter between the lens body and the imaging sensor. In one embodiment the lens holder is fixedly attached to the circuit board on which the image sensor is mounted. In another embodiment the imaging sensor is fixedly attached to the lens holder and the lens holder with the sensor are attached through electronic interconnects to the imaging electronics. Non-limiting examples of electronic interconnects include wires, contact pads on a circuit board including soldered interconnects, wire bonding and other techniques known in the art.

Figure 1A:
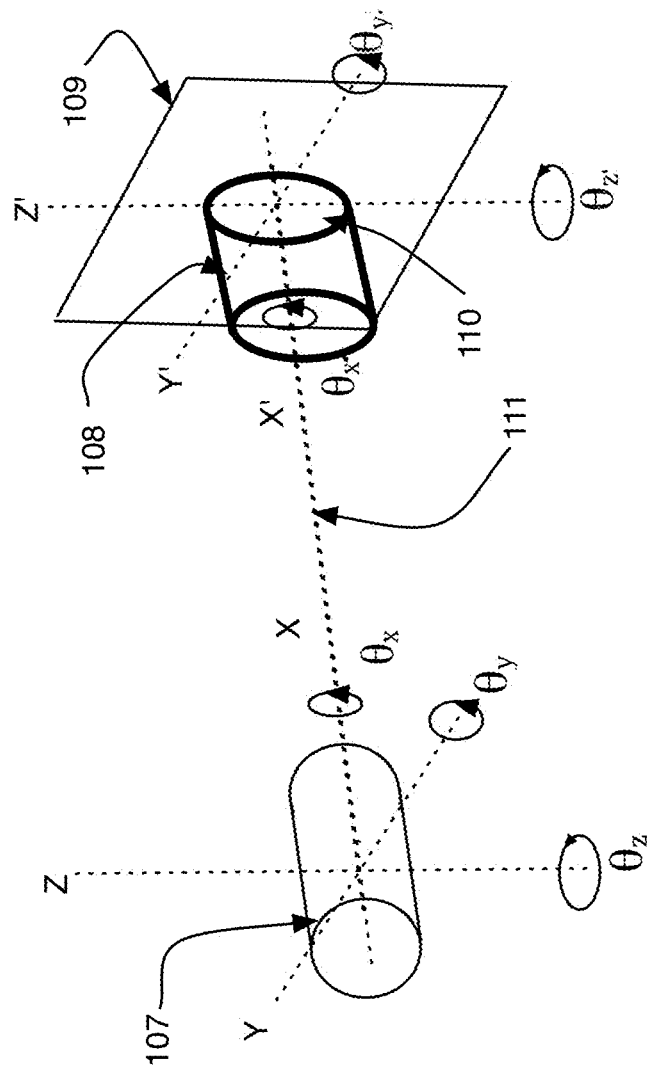
FIG. 1A shows a schematic view of embodiments of the invention and a coordinate system.

Referring now to FIG. 1A, a lens mount is comprised of a lens body 107 and a lens holder 108 that is designed to connect to the lens body. The lens mount allows removable attachment of a lens body to the lens holder and aligns the lens body focal plane with the image plane 109 of an image sensor 110 (not shown on the drawing). In a preferred embodiment the lens body and the lens holder are aligned and connected along the X and X' axis 111 as shown and the focal plane of the lens held within the lens body is aligned with the image plane of the sensor. In another embodiment, discussed in conjunction with FIG. 29, the lens body and lens holder are fixed relative to one another along any arbitrary other axis and a mirror or mirrors are used to align the focal plane of the lens within the lens body with the image plane of the image sensor.

The position in space of the lens body is described by X, Y, and Z coordinates and rotation of the lens body around those coordinate axis as indicated by the rotation angles θx, θy and θz. In a preferred embodiment, the optical axis of the lens within the lens body is along the X-axis. Also in a preferred embodiment, as shown in FIG. 1A, the lens holder 108 is attached to the image sensor 110. The position in space of both the image plane of the image sensor and the position of the lens holder can therefore similarly be described by a Cartesian coordinate system (X', Y', Z') and rotations ($\theta_{X'}$, $\theta_{Y'}$ and $\theta_{Z'}$) about the three axis. The lens body and the lens holder include reference surfaces. The reference surface of the lens body is made to be in a known fixed relationship with the focal plane of the lens. The reference surface of the lens holder is made such that when the lens holder is attached directly or indirectly to an image sensor the relative locations of the lens holder reference surface and the image plane of the image sensor are precisely known and defined. Precisely known and defined means that location of the reference surface and the location of the focal plane are either known or fixed with respect to the Cartesian coordinates X, Y, Z and the rotations about these three axis. When the reference surface on the lens body is mated with the reference surface on the lens holder, the optical axis of the lens and the center of the image plane of the sensor are aligned and the image plane of the sensor and focal plane of the lens are coincident. Alignment therefore has the meaning that the coordinates X, Y, Z, θx, θy, and θz of the lens body and the coordinates X', Y', Z', $\theta_{X'}$, $\theta_{Y'}$ and $\theta_{Z'}$ are related such that the focal plane of the lens is centered on and coincident with the image plane of the sensor. The following specific examples show how this is accomplished with reference points and surfaces located on both the lens body and the lens holder. Although shown as cylindrical the lens body and lens holder need not be cylindrical. In some embodiments the location is defined with respect to all Cartesian and rotation coordinates. In other embodiments alignment means fixed with respect to Cartesian coordinates and two of the three rotations. In particular several embodiments allow free rotation about $\theta_X$ while still maintaining alignment along all other coordinates.

Figure 2:
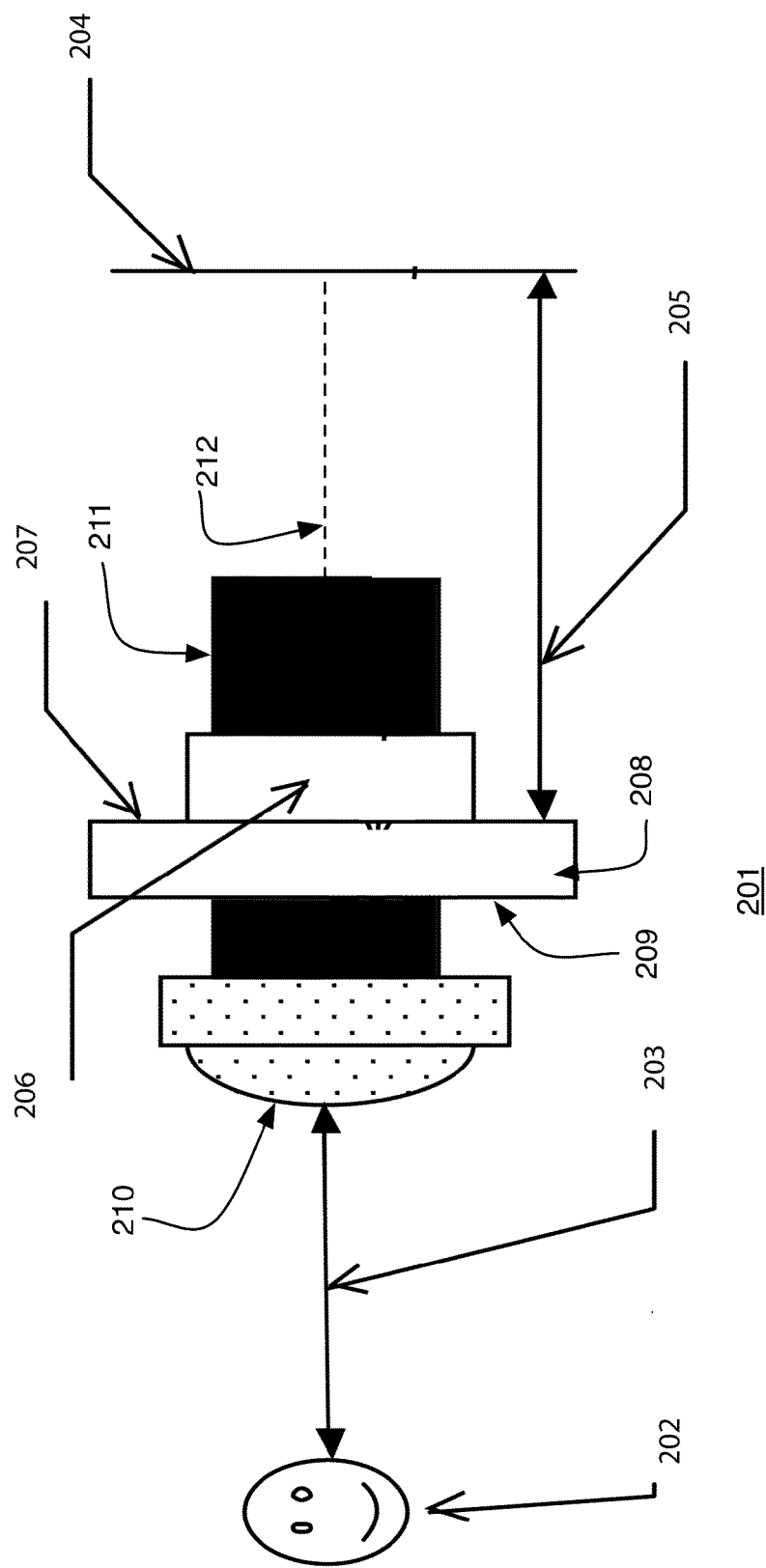
FIG. 2 shows a first embodiment of a lens body of the invention.

Referring now to FIG. 2, a lens body embodiment is shown. The lens body 201 is a cylindrical structure shown here in a cross-section view. The object to be imaged 202 is located at distance 203 from the lens body 201. The focal plane of the lens 204 is located on the right side of the lens body. The lens body consists of lens elements 210 mounted in a cylindrical cavity 211. In a typical application there are more than one lens elements. The other lens elements, not shown, are contained within the lens body structure 211. In a preferred embodiment, the lens elements are mounted within the lens body such that the optical axis 212 of the lens is coincident with the central axis of the lens body. The lens body further contains a flange structure 208 that is attached to the lens body structure 211. The flange structure optionally includes a cylindrical mounting portion 206. In a preferred embodiment at least one of the flange 208 surfaces 207, 209 are perpendicular to the optical axis of the lens and parallel to the focal plane 204. At least one of the flange surfaces is a reference surface that is located at a known distance 205 (as shown, surface 207 is assumed to be the reference surface), and, in fact at known coordinates in all Cartesian directions and rotations about the Cartesian coordinates as discussed in conjunction with FIG. 1A, relative to the focal plane. The precision alignment of the flange reference surface 207 to the lens focal plane 204 is achieved during assembly of the lens body. The distance 205 is a common aspect of all lenses regardless of the exact optical properties of the lens such as its focal length, back focal length, etc. Since the flange surface is at a known distance 205 from the focal plane of the lens, the flange surface acts as a reference plane to precisely align other objects, such as the image plane of an image sensor, relative to the focal plane of the lens. The surface provides a reference not just for the distance 205 but also for placement relative to the two other axes perpendicular to the optical axis such that use of the flange surface as reference plane can ensure alignment of the focal plane of the lens with the image plane of the sensor with respect to three axes and rotations of the planes about the three axes. In some embodiments, since three points define a plane, the surface 207 can also be substituted by a set of three or more reference points on the flange 208. Though FIG. 2 shows that the reference surface 207 is the right surface of the flange, in other embodiments, not shown in this Figure but discussed and shown later, the left surface 209 of the flange is used as the reference surface. In still other embodiments the reference surface is a plane defined by three reference points on the flange.

Figure 3:
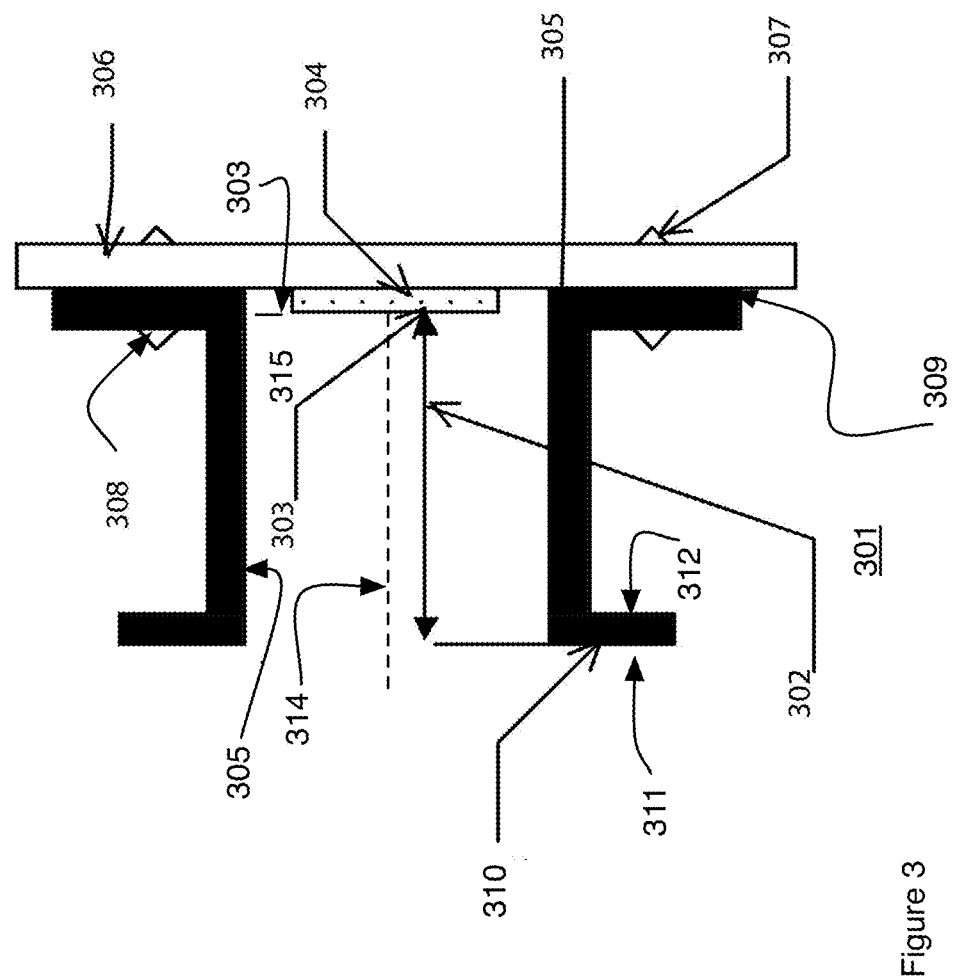
FIG. 3 shows a first embodiment of a lens holder and imager.
Figure 4:
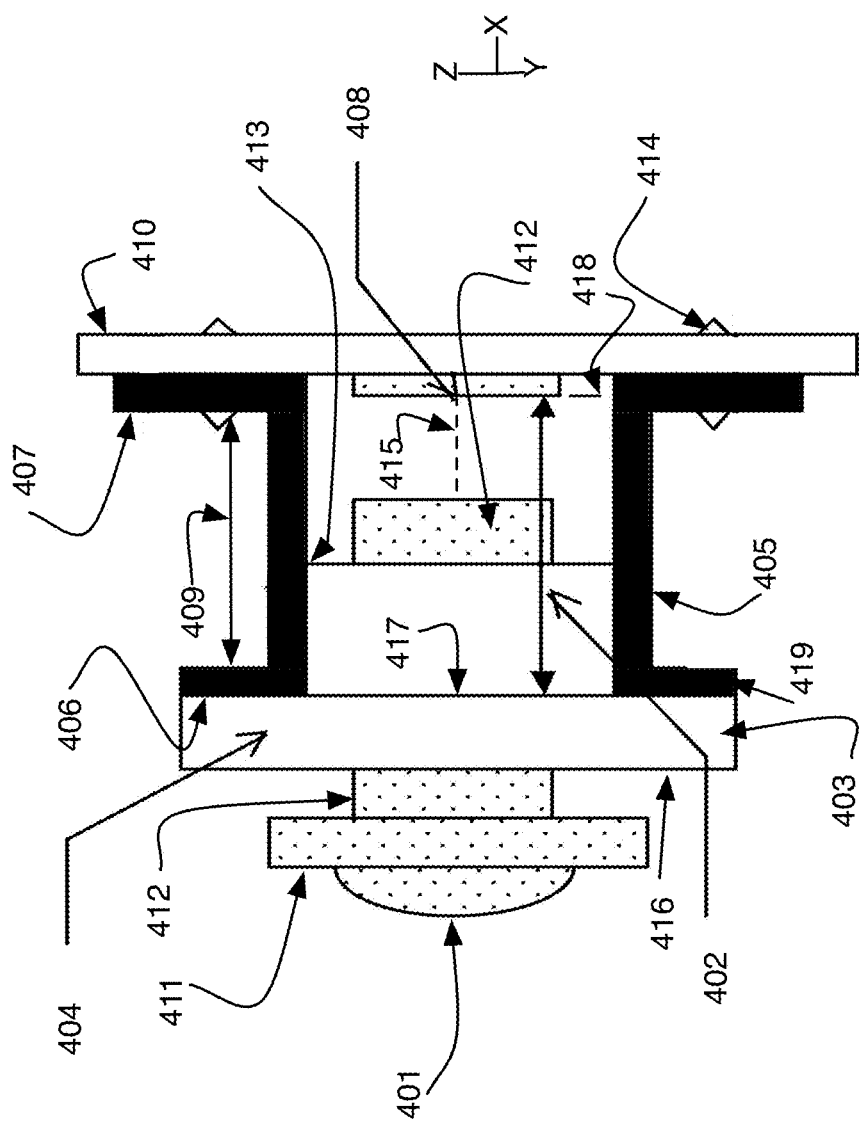
FIG. 4 shows the elements of FIGS. 2 and 3 combined.

Referring now to FIG. 3 the second general component of the preferred embodiment, the lens holder, is shown. The lens holder 301 is mechanical structure that is meant to mate with the lens body discussed above. The lens holder is comprised of a cylindrical section 305 with flange 310 at one end of the cylinder. The other end 309 of the lens holder is attached to the substrate 306 upon which the imaging sensor 304 is attached. The lens holder is held fixed to the image sensor substrate with fasteners 307, 308. Non-limiting exemplary fasteners include screws and rivets. In another embodiment the fasteners may be replaced with an adhesive applied at the interface between the lens holder flange and the substrate 306. A flange 310 is manufactured such that it is at a known distance 302 from the image plane 303 of the sensor 304. The flange 310 may be located at a variety of locations on the lens holder. The flange 310 is also parallel to the image plane of the sensor. The flange 310 includes two flange surfaces 311, 312. In a preferred embodiment, at least one of the two flanges surfaces 311, 312 is both parallel to the image plane of the sensor and at a known distance from the image plane. The distance 302 in the illustrated case is measured to the outer surface 311. One of the surfaces 311, 312 acts as reference surface to position the lens body at a fixed and known distance relative to the image plane of the sensor and in a preferred embodiment at a fixed orientation, namely parallel to the image plane of the sensor. In a preferred embodiment the central axis of the lens holder 314 is positioned to intersect the center of the image plane of the sensor 315 and perpendicular to the lens holder reference surface. The central axis of the lens holder coincides with the optical axis of the combined lens body and lens holder discussed below. Combined the lens body and lens holder form the lens mount as shown in FIG. 4. The lens mount is comprised of a lens holder 405 and a lens body 411. The components of each of these elements separately were described in conjunction with FIGS. 2 and 3 above. In the embodiment shown, the lens holder and lens body are both cylindrical elements shown here in a cross-section view and the elements fit together concentrically. The lens body 411 is comprised of lens elements 401 which are fit in a central cylinder 412 such that the optical axes of the lens elements and the central axis of the cylinder in which the lens elements are mounted are coincident 415. In a preferred embodiment this line is positioned to intersect the center point of the image plane of the sensor 408. The lens body further includes a flange 403 the flange has surfaces 416 and 417. At least one of the flange surfaces is a reference surface that is at a fixed coordinates and rotation relative to the focal plane 418 of the lens. The lens body is fit within the lens holder 405 such that the outer surface of the cylindrical mounting portion of the lens body fits within the inner wall lens holder meeting at point 413. The inner surface of the lens holder and the outer surface of the lens body meet 413 to align the lens within the lens holder such that the optical axis of the lens 415 is aligned at the center point of the image plane of the sensor 408. In another embodiment shown in detail below, alignment of the optical axis of the lens with the center point of the image plane of the sensor is accomplished through use of indicia located on the lens body flange 403 and the lens holder flange 419. In the embodiment shown in FIG. 4 the indicia, not shown, are located on the lens body flange surface 417 and the lens holder flange surface 406. The image sensor 408 is mounted to a substrate 410 through means already discussed above. The lens holder is attached to the same substrate 410 through the rightmost lens holder end 407 using connectors 414 again as already discussed. The dimension 409 of the lens holder and the location of the lens body flange 404 are manufactured such that when mated as shown the focal plane of the lens and the image plane of the sensor 418 are aligned. The surfaces 417 and 406 are manufactured to be reference surfaces that define the distance 402, as well as the other Cartesian coordinates and rotation angles relative to the lens focal plane and the sensor image plane. In this embodiment, the lateral position (in the y-z plane) of the lens focal plane is constrained by the clearance 413 between the lens body outer diameter and the lens holder inner diameter. The X, Y, Z coordinates as well as the tilt angles $\theta_X$, $\theta_Y$ and $\theta_Z$ of the focal plane of the lens contained within the lens body and the image plane of the sensor are constrained such that the focal plane of the lens and the image plane of the sensor are aligned.

There are several different methods used to hold the lens body in contact with the lens holder. In a first embodiment the clearance 413 is adjusted such that there is a friction fit between the lens holder and the lens body. In another embodiment the lens holder is manufactured from a permanent magnetic material and the lens body is ferromagnetic such that the magnetic attraction holds the flange surfaces 417 and 406 in contact. In another embodiment the lens body is made of a permanent magnetic material and the lens holder is ferromagnetic. In another embodiment both the lens body and the lens holder are permanent magnets and the polarity of the magnets are chosen such that the parts attract in the position shown in FIG. 4. Finally in another embodiment magnets are embedded in either the flange surface 406 of the lens holder or the flange surface 417 of the lens body or both with the counterpart lens body or lens holder being ferromagnetic of the polarity of the magnets chosen such that the parts are magnetically held in the position shown in FIG. 4. Other means for removably attaching the lens body and lens holder are discussed below.

Figure 5:
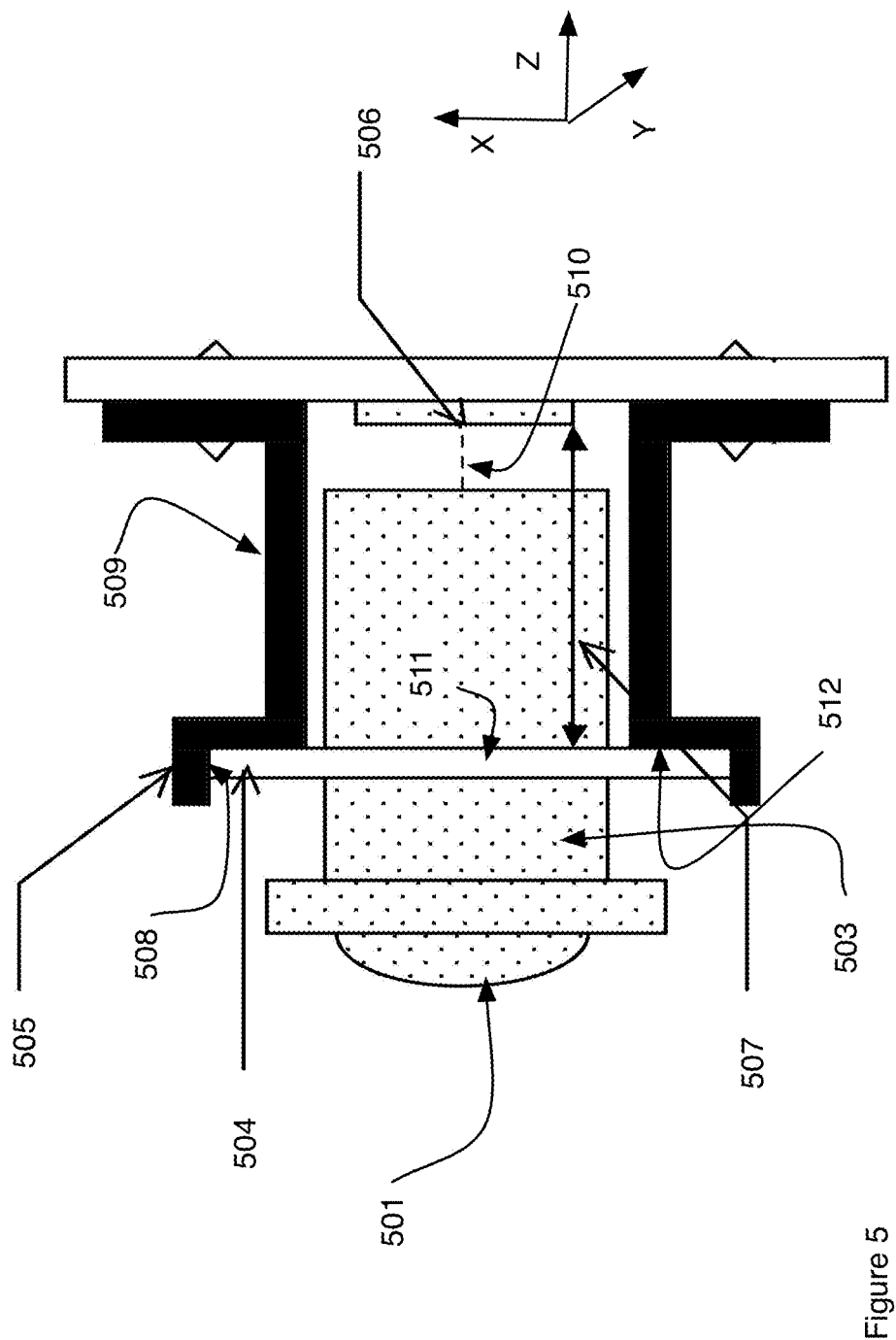
FIG. 5 shows a second embodiment of a combined lens body and lens holder.

In another embodiment shown in FIG. 5, the flange on the lens holder further includes a guiding edge 505. The outer edge 508 of the flange 504 on the lens body abuts against the guiding edge 505 thereby centering the lens body 503 in the lens holder 509. In a preferred embodiment, the lens body is manufactured such that the optical axis of the lens elements 501 lies on the center axis of the lens body 510. The centering of the lens holder over the image plane of the sensor 506 ensures the optical axis of the lens aligns with the center of the image plane of the sensor. The intimate contact of the lens holder flange reference surface 512 with the lens body flange reference surface 511 assures that the distance 507 is set such that the image plane of the sensor is aligned with the focal plane of the lens. The contacting flanges 511, 512 ensure precise alignment of the lens in the X, Y and Z directions and control of the tilt ($\theta_Y$ and $\theta_Z$) of the focal plane of the lens relative to the image plane of the sensor. The Cartesian coordinate system and angles are as previously described in conjunction with FIG. 1A. The surfaces of the guiding edge and the edge of the flange ensure precise centering of the lens over the image plane of the sensor. The embodiment shown in FIG. 5 uses the same means of holding the lens holder in contact with the lens body as already discussed. In one embodiment friction fit at the interface is used to hold the lens body and lens holder together. In another embodiment magnetic forces are used to hold the lens body and lens holder together. In both embodiments the lens body is removably attached to the lens holder. To remove the lens, one simply pulls the lens body from the lens holder.

Figure 6:
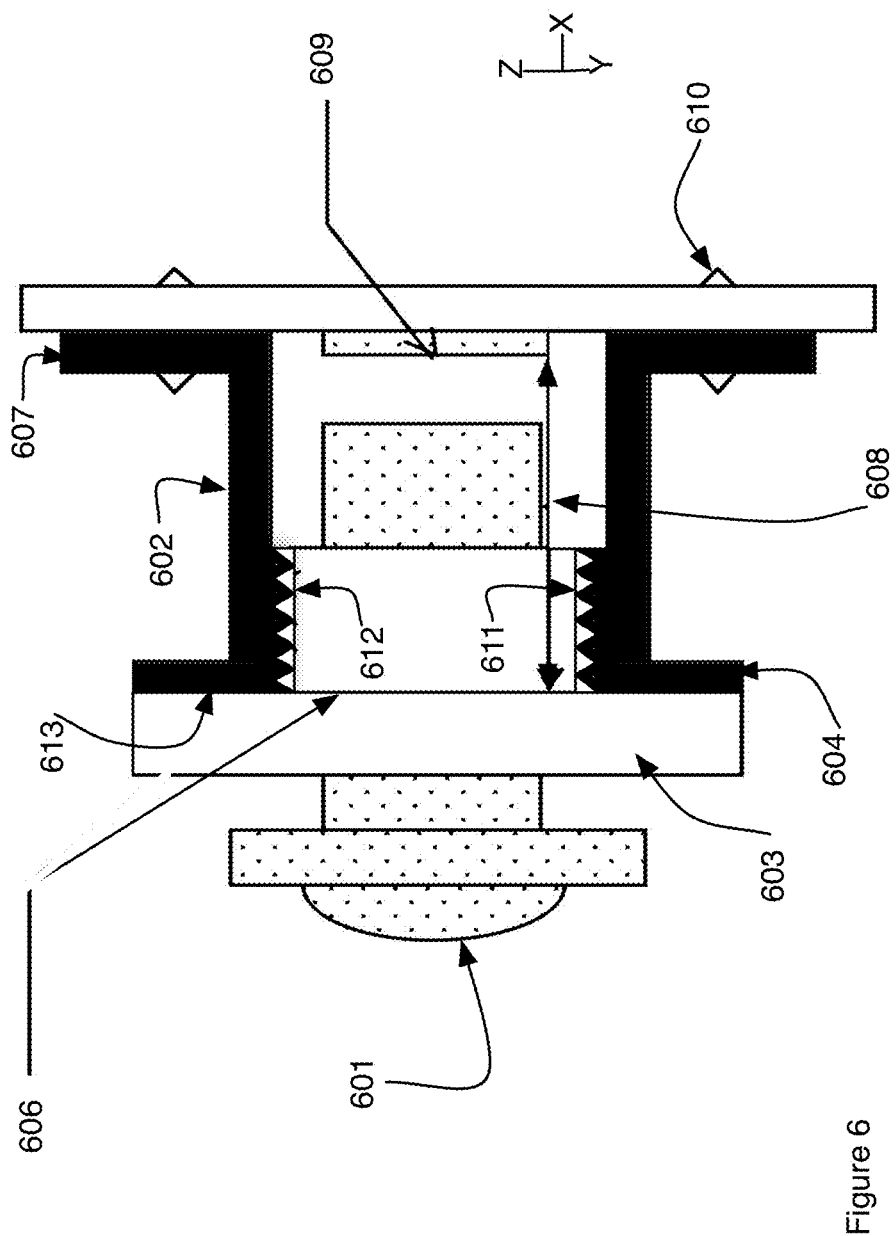
FIG. 6 shows a screw mount embodiment of a lens body to a lens holder.

Referring now to FIG. 6 another embodiment of the invention is shown. The lens mount is comprised of a lens body 601 and a lens holder 602. The lens body includes lens elements contained within to form a lens and a flange 603 having a reference surface 606. The lens holder includes two flanges. A first optional flange 607 is used to connect the lens holder to a substrate 610. The first flange is optional in that other means to connect the lens holder to the substrate can be used to the same effect. A second flange 604 is intended to mate with the flange 603 of the lens body at reference surface 613. The lens holder further includes screw threads 611 that mate with screw threads 612 on the lens body. When the lens body is fully screwed into the lens holder the reference surface 606 of the lens body flange 603 meets reference surface 613 of lens holder flange 604. The distance 608 is set such that the focal plane of the lens is coincident and aligned with the image plane of the sensor 609. The image sensor 609 is attached to the substrate 610.

In another embodiment of FIG. 6 the reference surfaces of the lens body and the lens holder are the threaded surfaces 611, 612. The location of these surfaces are precisely manufactured to be at known location with respect to the Cartesian coordinates and rotation angles as discussed in conjunction with FIG. 1A. The reference surface 611 is defined relative to the focal plane of the lens and the reference surface 612 is defined relative to the image plane of the image sensor and when the reference surfaces 611, 612 are mated by screwing the lens body fully into the lens holder the focal plane and the image plane are aligned. Note that in this embodiment alignment in Y, Z, $\theta_Y$ and $\theta_Z$ are determined by the threaded reference surfaces 611, 612 and alignment in X and $\theta_X$ is determined by reference surfaces 606, 613. In another embodiment, not shown, spacers may be placed between reference surfaces 606, 613 to accommodate lenses having different focal plane locations.

Figure 7:
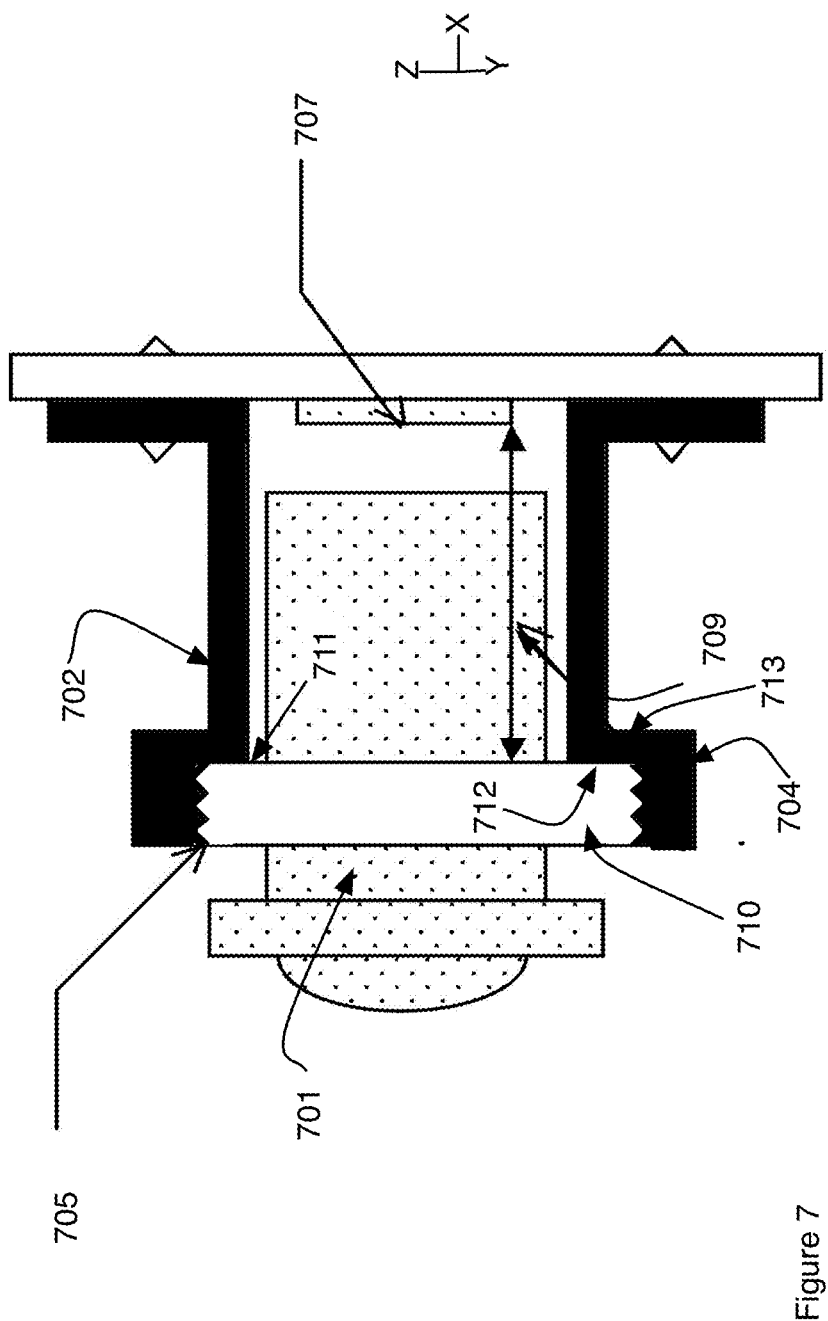
FIG. 7 shows a second version of a screw mount embodiment of a lens body to a lens holder.

In another embodiment shown in FIG. 7, a lens body 701 and a lens holder 702 both include screw threads 705. On the lens body the screw threads are located at the edge of the lens body flange 710. On the lens holder the threads are located on the inner surface of a guiding edge 704. The guiding edge is an extended structure and located on the lens holder flange 713. The mating of the reference surface 711 of the lens body flange with the reference surface 712 of the lens holder flange defines the distance 709 such that the focal plane of the lens is coincident with the image plane of the sensor 707.

Figure 8:
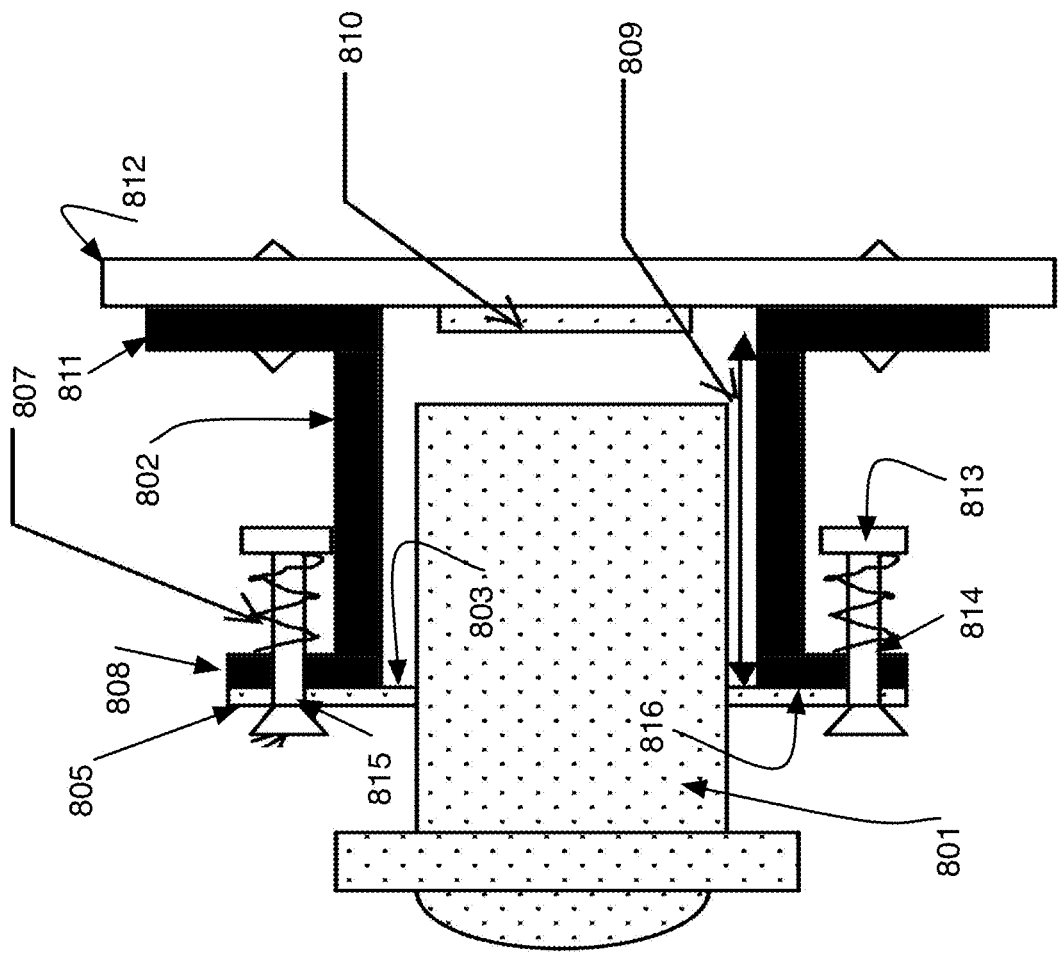
FIG. 8 shows an embodiment using spring-loaded pins to fasten a lens body mount to a lens holder.
Figure 9:
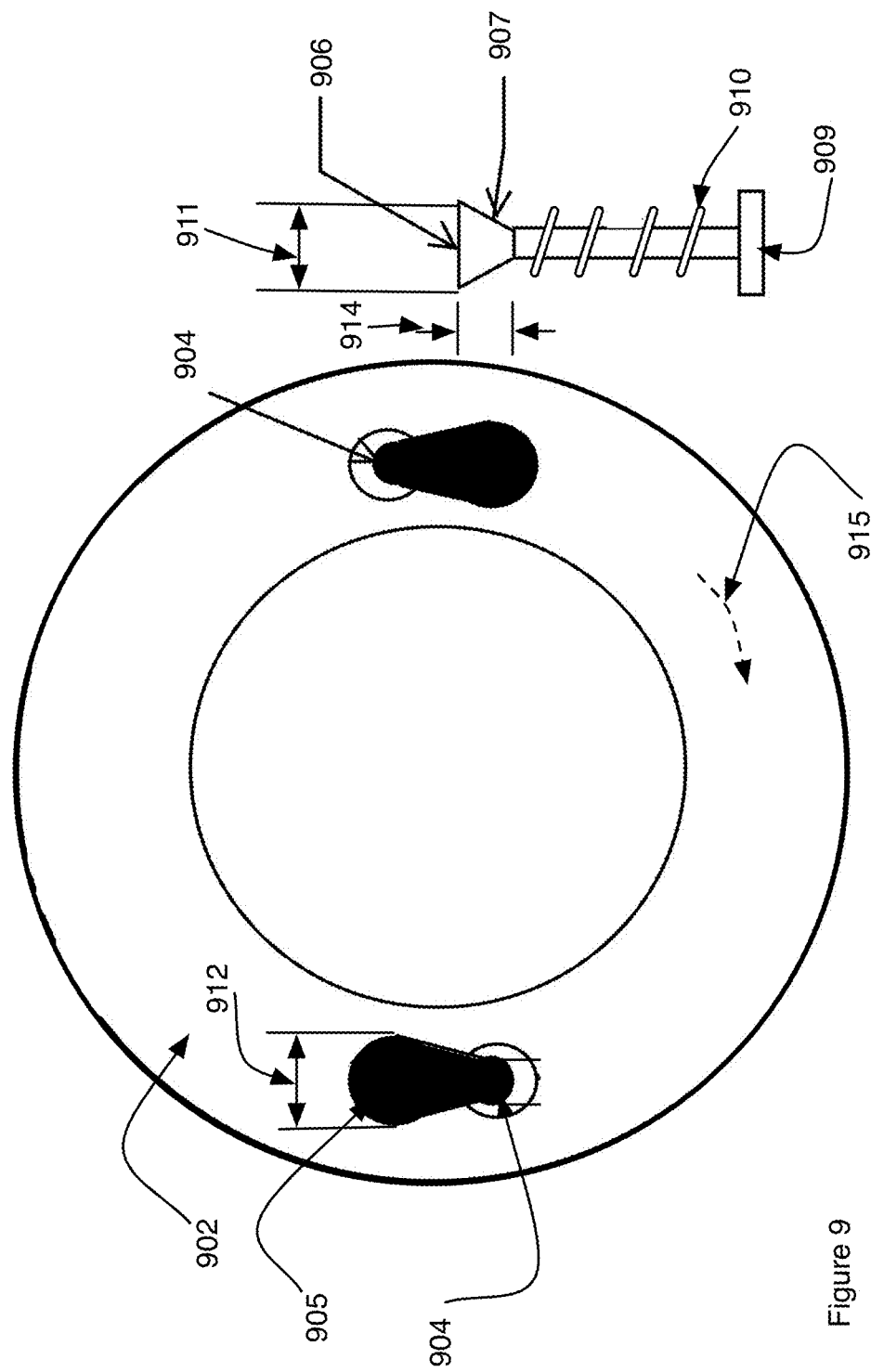
FIG. 9 is another view of the embodiment shown in FIG. 8.

In another embodiment, shown in FIGS. 8 and 9, a lens mount is comprised of a lens body 801 and a lens holder 802 wherein the lens body and lens holder are removably held together by spring loaded guide pins. Two or more guiding pins are used to provide stability. Two pins are shown in FIGS. 8 and 9. The lens body includes a flange 805 with reference surface 803. The lens holder includes two flanges 808, 811. A first optional flange 811 is used to secure the lens holder to the substrate 812. The image sensor 810 is mounted to the substrate. The second flange 808 of the lens holder having a reference surface 816 meets with the flange 805 of the lens body such that when there is intimate contact between the flange's surfaces 803, 816 and the distance 809 is fixed such that the focal plane of the lens 803 and the image plane of the sensor 810 are aligned. The surfaces 803, 816 are reference surfaces.

The flange on the lens body 805 includes holes 815 that when the lens is properly seated align with holes 814 in the flange on the lens holder. Pins 813 fit through the aligned holes 814, 815. Each pin 813 is spring 807 loaded such that it is normally compressed against lens holder flange 808 surface. In the example two pins are used but in other embodiments a plurality of at least two pins are used. The pins and the holes align and fix the lens body and lens holder with respect to $\theta_X$. Referring now to FIG. 9 a top view of the lens body flange of FIG. 8 is shown. The hole in the lens body flange surfaces is seen to be non-circular. The hole in the lens body flange is a thru-slot. The shape of the thru-slots is such that the larger end 905 of the slot fits over the head or cap 906 of the guiding pin 909. The dimension 912 is larger than the dimension 911. The pin head 906 or cap has a sloped side 907. The height 914 of the pin cap is greater than the thickness of the lens flange 805 (see FIG. 8). The lens body is removably installed by aligning the pin caps 906 with the larger ends 905 of the slots. When the lens is twisted 915 towards the smaller ends 904 of the thru-slots the spring-loaded guiding pins 909 are lifted away from the lens body flange surface as the tapered edge of the pin head 907 moves along the slot from the larger end 905 towards the smaller end 904. The inside surface of the smaller end 904 of the thru-slot is tapered to match the slope 907 on the pin head. Once the pin head reaches the smaller end and the tapered area the pin head drops slightly due to the compression of the springs 910. This serves as a detent feature providing a positive confirmation that the lens is installed properly. The spring loaded pins 909 snap the lens flange 902 in place providing a secure positioning of the lens body with respect to the lens holder. The lens is removed by twisting the lens in the other direction until the larger ends 905 of the slots are aligned with the pin caps 906, and the lens body is pulled away from the lens holder. The detents are also useful for providing resistance from accidental removal of the lens due to shock or vibration.

Figure 10:
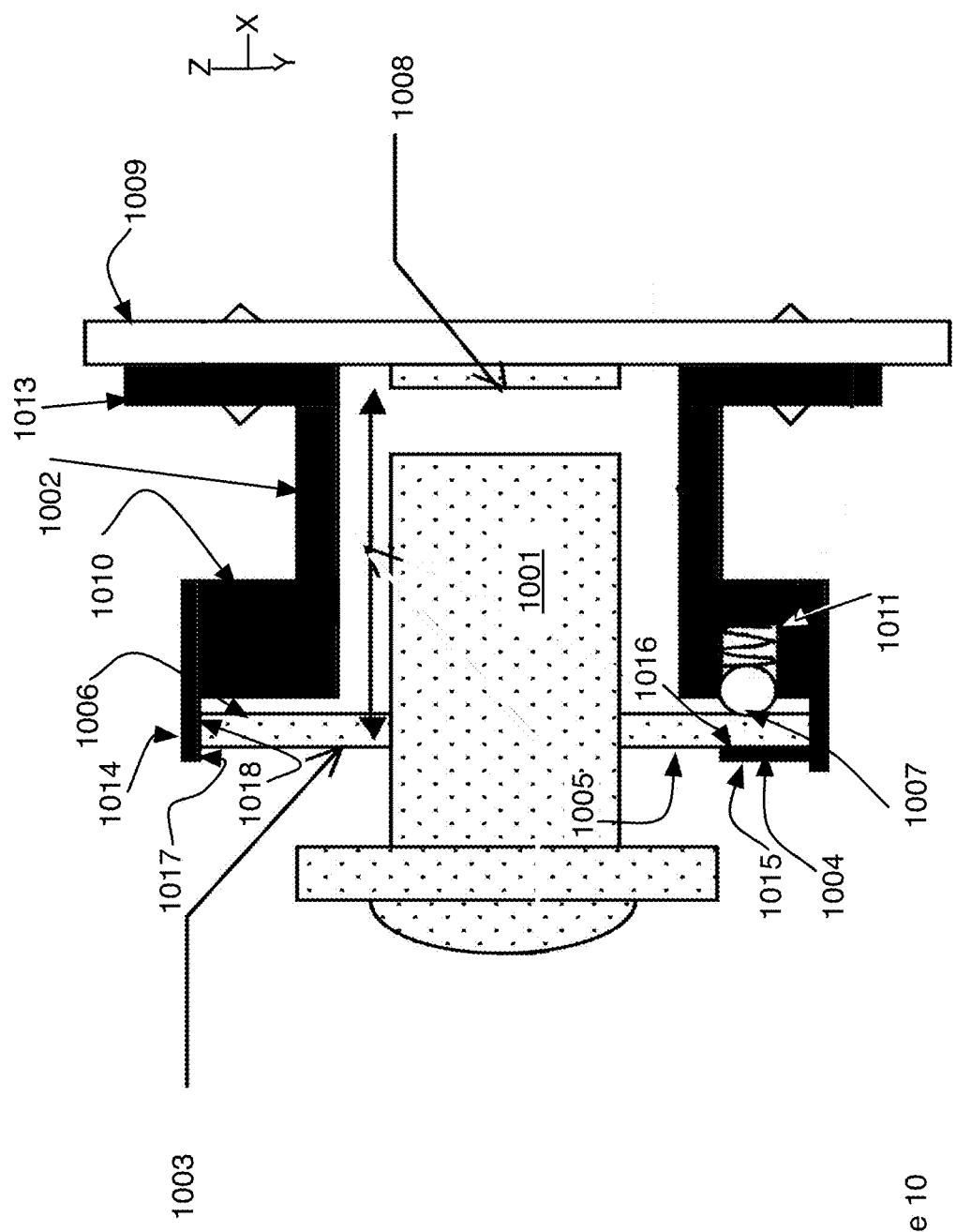
FIG. 10 shows an embodiment using a spring-loaded sphere in contact with a reference surface in the connection between a lens body mount and a lens holder.
Figure 11:
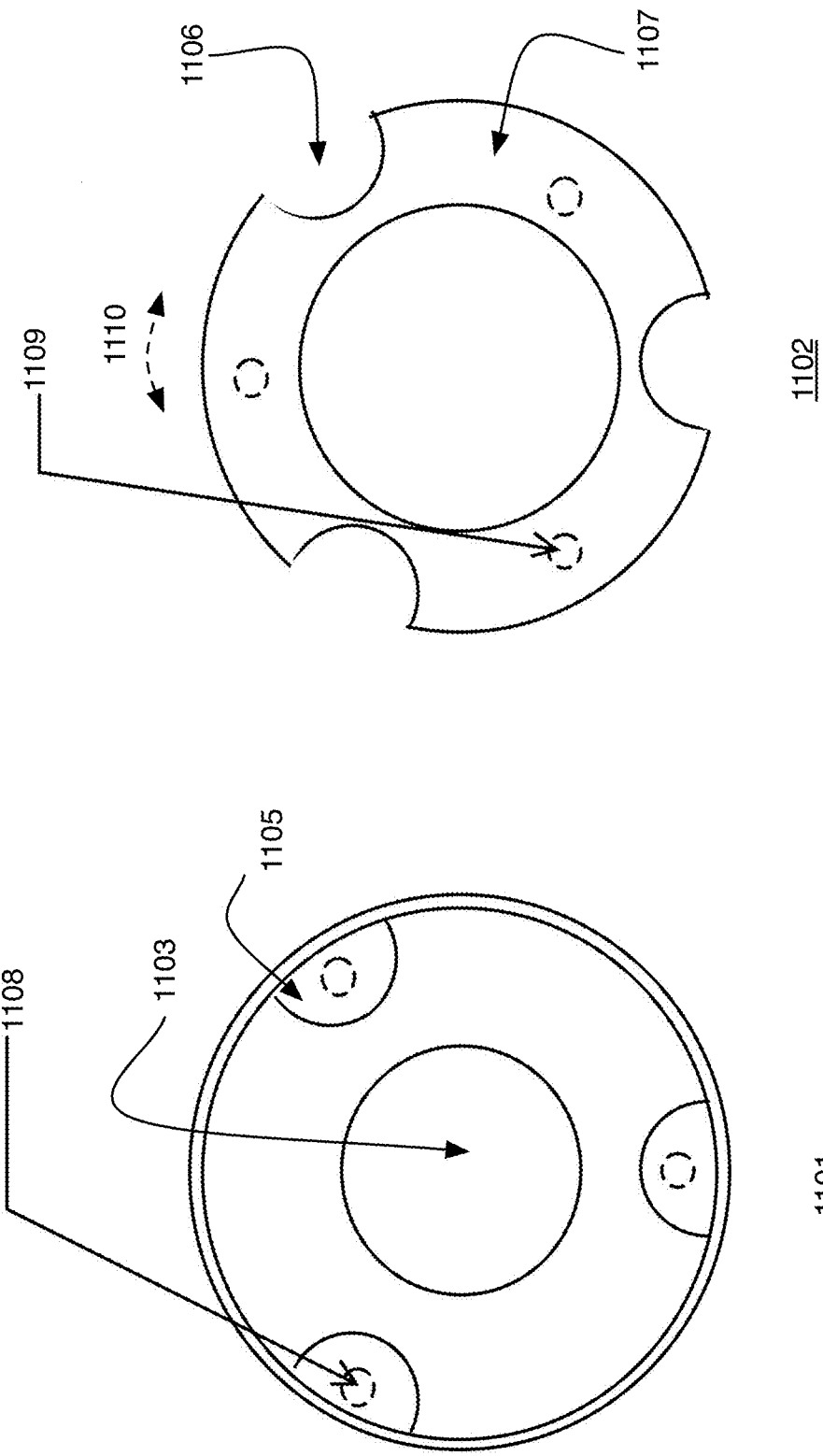
FIG. 11 is an end on view of an assembly using spherical contact points such as shown in FIG. 10.

Another embodiment of the invention, shown in FIGS. 10 and 11, uses spring-loaded balls where the left surface of the lens body flange is used as a reference surface. The embodiment is comprised of a lens body 1001 and a lens holder 1002. The lens body includes a flange 1003 the flange having a first reference surface 1005 and a second surface 1006. The lens holder includes a first optional flange 1013 and a second flange 1010. The first flange 1013 is attached to a substrate 1009 and an image sensor 1008 is attached to the substrate as well. The lens holder second flange 1010 further includes at least two structures (only one of which is shown in FIG. 10) to engage the flange 1003 of the lens body. The first structure is comprised of a cavity 1011 in which is located a spring-loaded ball 1007. The structure on the lens holder flange further includes an edge guide 1014 that is perpendicular to the lens holder flange 1010. The structure further includes a tab 1004. The tab has two surfaces 1015, 1016 wherein when the lens body is installed in the lens holder one surface 1016 engages a surface 1005 of the lens body. These surfaces 1005, 1016 are reference surfaces that align the lens focal plane with the image sensor image plane with respect to the X, $\theta_Y$ and $\theta_Z$ coordinates. The surfaces 1016, 1005 are held in contact by pressure exerted by the spring-loaded balls against surface 1006 of the lens body flange 1003. The reference surface 1017 is located on the edge guide 1014 and the reference surface 1018 is the edge of the lens body flange 1003. When mated the reference surfaces 1017, 1018 align the focal plane of the lens with the image plane of the sensor in the Y, Z directions.

Referring now to FIG. 11, top views of the lens holder 1101 and the lens body 1102 are shown. The lens body flange 1107 is seen to include cut outs 1106 that are sized to fit past the tabs 1105 on the lens holder. The lens body flange further includes indentations 1109. The indentations are located on the lower surface 1006 (FIG. 10) of the lens body flange 1107 and are sized to mate with the spring-loaded balls 1108 of the lens holder. In use the lens body is inserted into the central cavity 1103 of the lens holder with the cut-outs 1106 aligned with the tabs 1105. The lens body is then rotated in either direction 1110 until the spring-loaded balls 1108 engage the indentations 1109 of the lens body flange. The engage tabs and spring-loaded balls provide a detent or snap fitting of the lens body into the lens holder and removably secure the lens body to the lens holder. Although only three spring-loaded balls and tabs and indentations are shown in FIG. 11, it is possible to use more spring-loaded balls to provide additional stability. The indentations and spring-loaded balls are reference points that align the focal plane of the lens and the image plane of the sensor with respect to $\theta_X$. The configuration as described will provide align the lens focal plane and the image plane of the sensor in the X, Y, and Z directions as well as $\theta_X$, $\theta_Y$ and $\theta_Z$. This configuration fixes the rotational position around the optical axis $\theta_X$ as well as the tilt angles for rotation about the Y and Z axis, $\theta_Y$ and $\theta_Z$.

Figure 12:
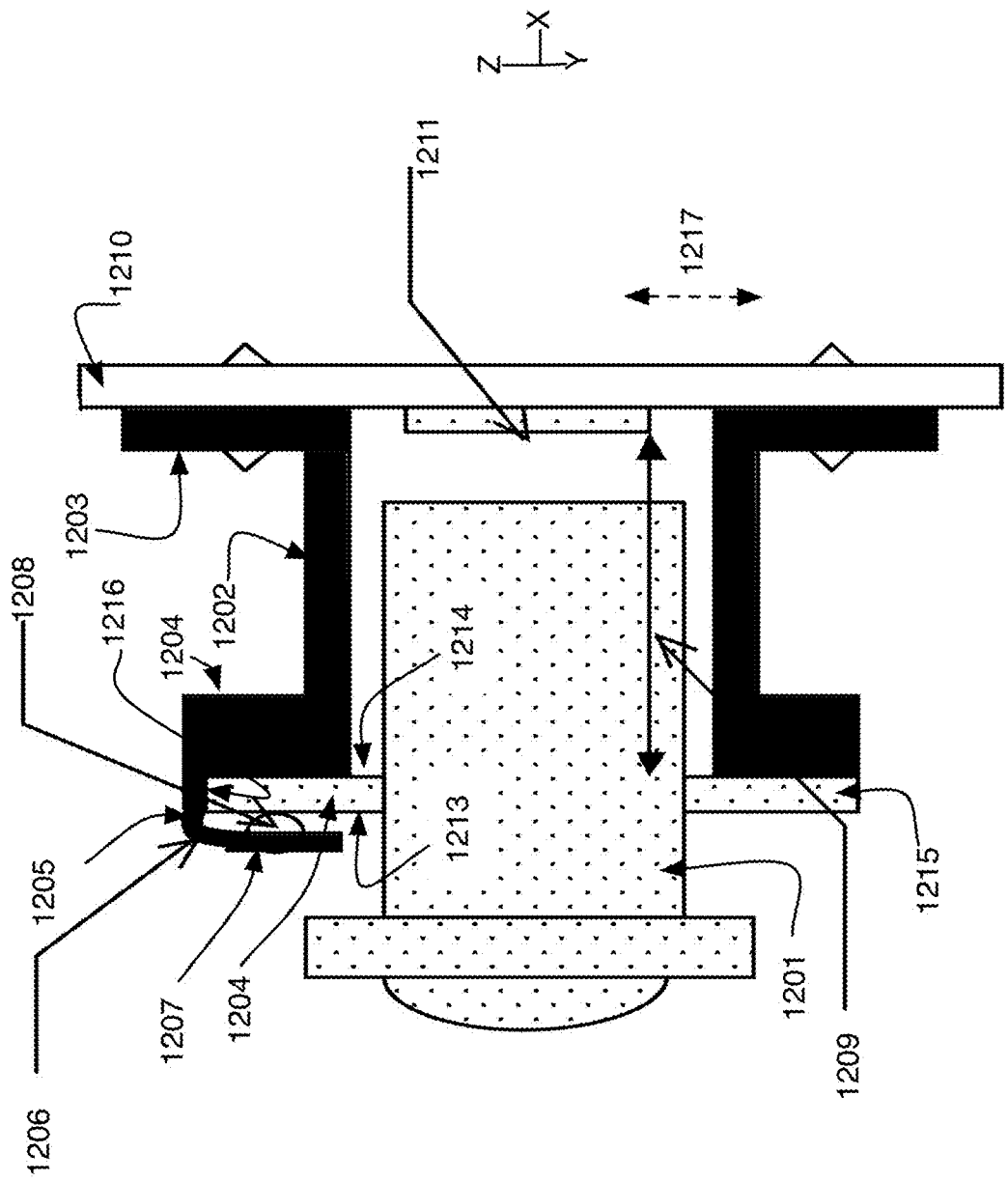
FIG. 12 shows a second embodiment using spherical contact points with a different reference surface from that shown in FIG. 10.
Figure 13:
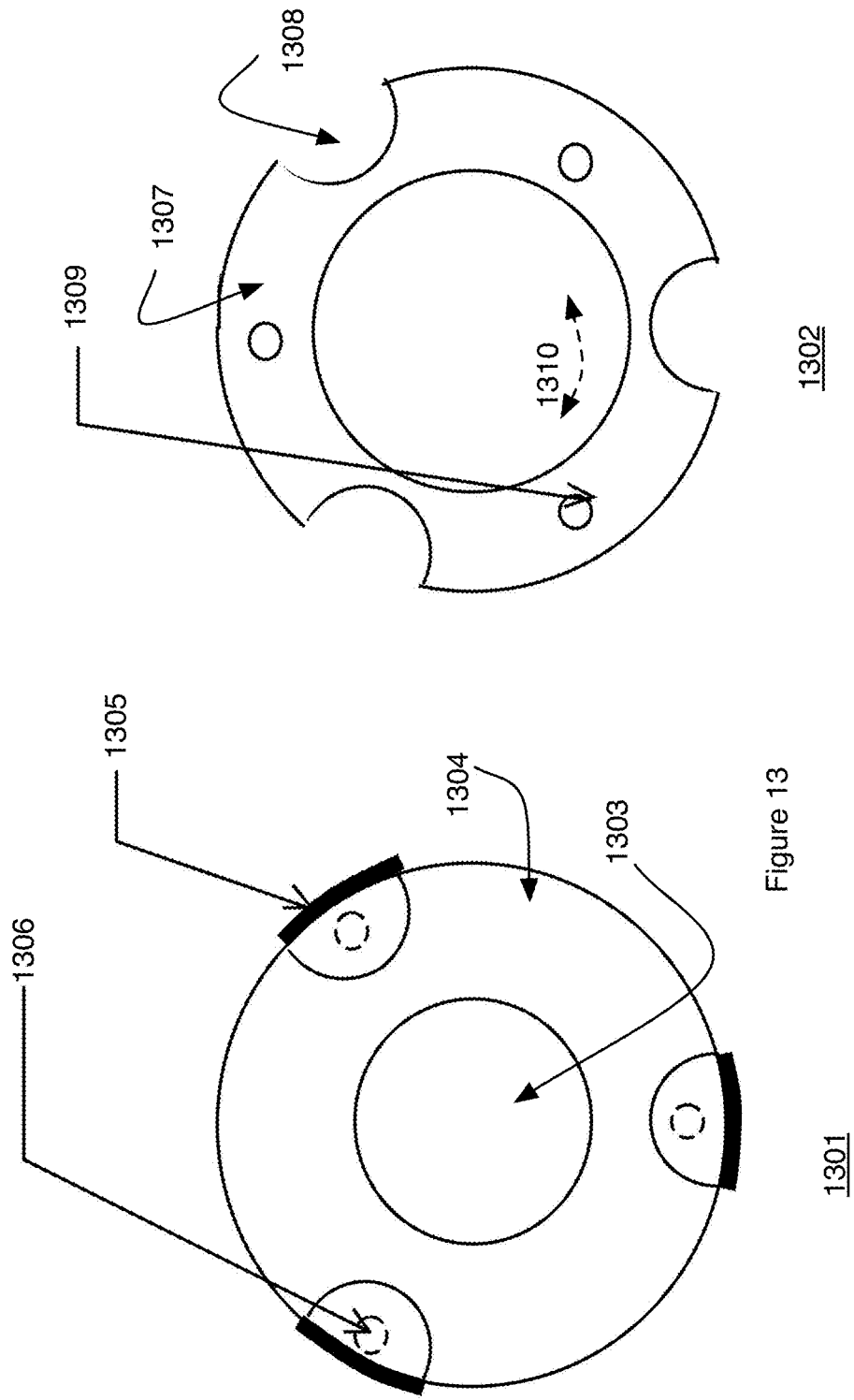
FIG. 13 is an end on view of an assembly using spherical contact points such as shown in FIG. 12.

In another embodiment shown in FIGS. 12 and 13, the spring-loaded balls of FIGS. 10 and 11 are replaced with a spring clip and half-sphere contacts. This embodiment includes as do all others a lens body 1201 and a lens holder 1202. The lens holder is comprised of an optional first flange 1203 and a second flange 1204. The first flange 1203 is attached to a substrate 1210. An image sensor 1211 is also attached to the same substrate 1210. The lens holder further includes an edge guide 1205. Extending from the edge guide 1205 is a spring tab 1207. The spring is defined by use of flexible spring material at the outside corner edge 1206 of the tab 1207. Non-limiting exemplary material for the spring material include spring steel and high modulus plastics. Attached to the bottom of the spring tab 1207 is a hemisphere 1208. Non-limiting examples of the hemisphere material include plastic and metals such as aluminum and steel. The spring tab is loaded such that the sphere presses down on the surface 1213 of the flange on the lens body 1201. The lens body includes a flange 1204 having a first surface 1213 and a second surface 1214. When the lens body 1201 and the lens holder 1202 are fit together the lens body flange reference surface 1214 is pressed against the lens holder flange reference surface 1215 thereby determining the distance 1209 such that the focal plane of the lens and the image plane of the sensor are coincident. The edge of the lens body flange 1204 is also a reference surface that is indexed against the inside edge 1216 of the lens holder edge guide 1205 thereby positioning the lens body 1201 relative to the image sensor 1211 in the lateral Y and Z directions. In the preferred embodiment the lens body is positioned such that the center of the lens body and the center of the image plane of the sensor are coincident. The focal plane of the lens and the image plane of the sensor are thereby fixed in X, Y, Z, $\theta_X$, $\theta_Y$ and $\theta_Z$, are mutually centered, coincident, and therefore aligned.

FIG. 13 shows an end on view of the lens holder 1301 and the lens body 1302 described in conjunction with FIG. 12 above. The lens holder includes a flange 1304 and spring tabs 1305. On the underside of the spring tabs are attached hemispheres 1306. The lens body flange 1307 includes cutouts 1308. The cutouts 1308 are sized to be larger than the tabs 1305 so that the with the cutouts aligned with the tabs, the lens body may be inserted into the cavity 1303 within the lens holder, over the top of the tabs to make contact with the surface of the lens holder flange 1304. Once contact is made the lens body is rotated in either direction 1310 until indentation 1309 on the lens body flange surface align with the hemispheres 1306 of the lens holder. The hemispheres then drop into the indentations under the force of the spring tab thereby snapping the lens body into position and providing a detent feel when the lens body is properly installed. The lens body may be removed by rotation in either direction 1310, aligning the cutouts 1308 with the tabs 1305 and lifting the lens body away. The hemispheres 1306 and the indentations 1309 are reference points. The configuration provides alignment through all coordinates including $\theta_X$ rotation about the optical X axis.

Figure 14:
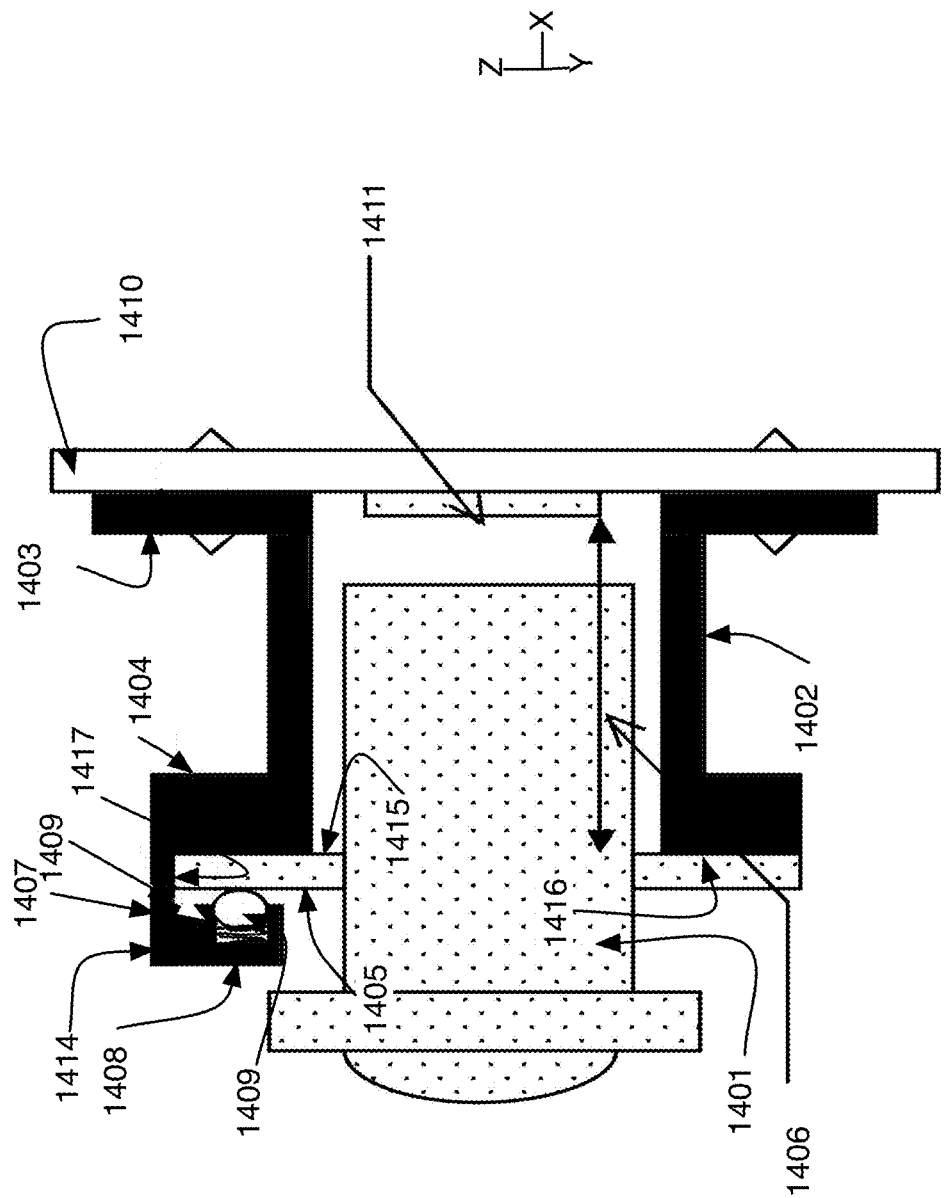
FIG. 14 shows an embodiment using spring-loaded spherical contacts on the embodiment of FIG. 12.

A variation on the spring clip embodiment of FIGS. 12 and 13 is shown in FIG. 14. This embodiment includes a lens body 1401 and a lens holder 1402. The lens holder includes two flanges 1403, 1404. The first flange 1403 is used to attach to a substrate 1410. The image sensor 1411 is also attached to the substrate 1410. The second flange 1404 includes at least two tabs 1407 (only one tab is shown in FIG. 14). The tab projects from the flange 1404 and includes a wall 1414 perpendicular to the flange 1404 and a second projection 1408 attached to the wall to form a C-shaped section. On the inside of the C-shaped section is a spring-loaded ball that is contained in an indentation in the projection 1408. The spring-loaded ball 1409 presses against the flange 1405 of the lens body to hold the lens body flange 1405 against the lens holder flange 1404. When held in contact the distance 1406 is determined such that the focal plane of the lens is coincident with the image plane of the sensor 1411. Although not shown, the top view of the tabs of FIG. 14 appear the same as the tabs and lens flange shown and discussed in FIG. 13. Surface 1415 on the lens body flange is a reference surface that when mated with reference surface 1416 on the lens holder flange 1404 aligns the focal plane and the image plane with respect to X, $\theta_Y$ and $\theta_Z$. Reference surfaces of the edge of the lens body flange and the wall 1414 mate 1417 to align the focal plane and the image plane with respect to Y and Z.

Environmental Seals

Frequently the lens mounts of the present invention are used in environments where it is advantageous to protect the inner workings of the lens and the image sensor. Examples would include damp or even completely immersed environments such as might be found where the lens is used as a sports camera. FIG. 15-20 show embodiments that include the features already discussed and further include environmental seals.

Figure 15:
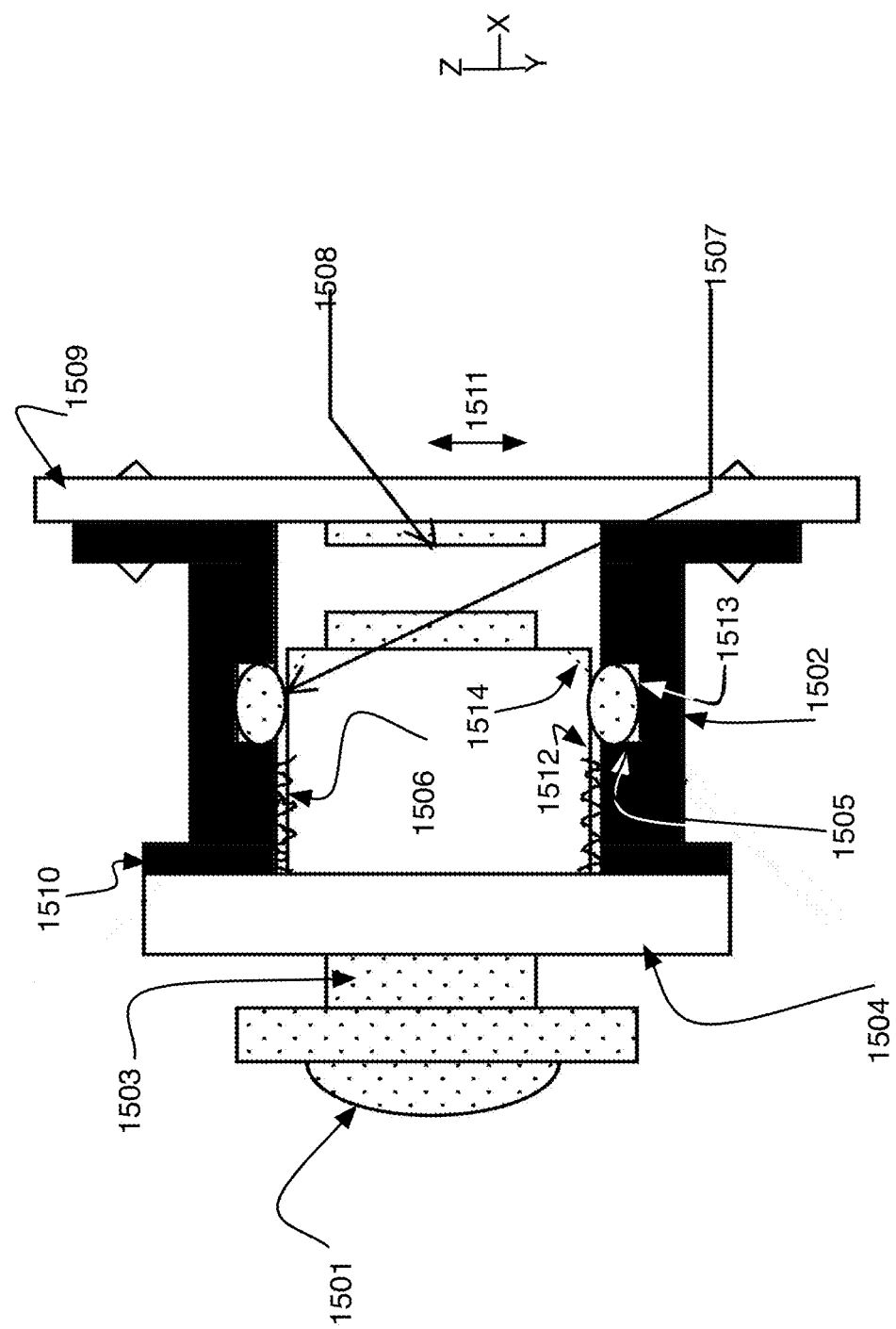
FIG. 15 shows an embodiment further including O-ring seal between the lens body mount and the lens holder.

Referring to FIG. 15, a first embodiment of environmental seals is shown. A lens body 1503 including a lens 1501 and a flange 1504 is inserted into a lens holder 1502. In the embodiment shown both the lens body and the lens holder are threaded with mating threads 1506 such that the lens body is screwed in to the lens holder until the flange 1504 on the lens body meets the flange 1510 on the lens holder. The mating surfaces on the flanges and the mating threaded surfaces are reference surfaces that align the focal plane and the image plane as already discussed. In other embodiments the lens body and lens holder are held together by for example magnetic forces, spring forces or friction fit all previously discussed. The seal 1507 is an O-ring or gasket made from suitable materials non-limiting exemplary materials include silicone, rubber, polyethylene, polypropylene and ethylene propylene diene monomer (EPDM). The seal resides inside a groove 1505 or pocket located on a surface of the lens holder. When the lens body flange 1504 is in contact with lens holder flange 1510, the seal 1507 compressed to form a dust/water barrier between the lens body and the lens holder. FIG. 15 shows an embodiment where the seal is compressed in the thickness direction 1511 between a surface of the lens holder 1513 and a surface of the lens body 1512. The compression ratio is determined by the depth of the groove 1505 and the diameter of the seal 1507 when uncompressed. In another embodiment the insertion leading edge 1514 of the lens body is chamfered or curved (shown here with dashed lines) to facilitate the insertion. Alignment of the lens 1501 with the substrate 1509 and the image sensor 1508 is determined by machining of the threads 1506 and the machined surfaces of the lens body flange and the lens holder flange which fit flush together when the lens body is fully screwed into the lens holder. The relative location of the lens and the sensor are thereby accurately determined and aligned using machined surfaces while still allowing a compressed flexible fitting for an environmental seal.

Figure 16:
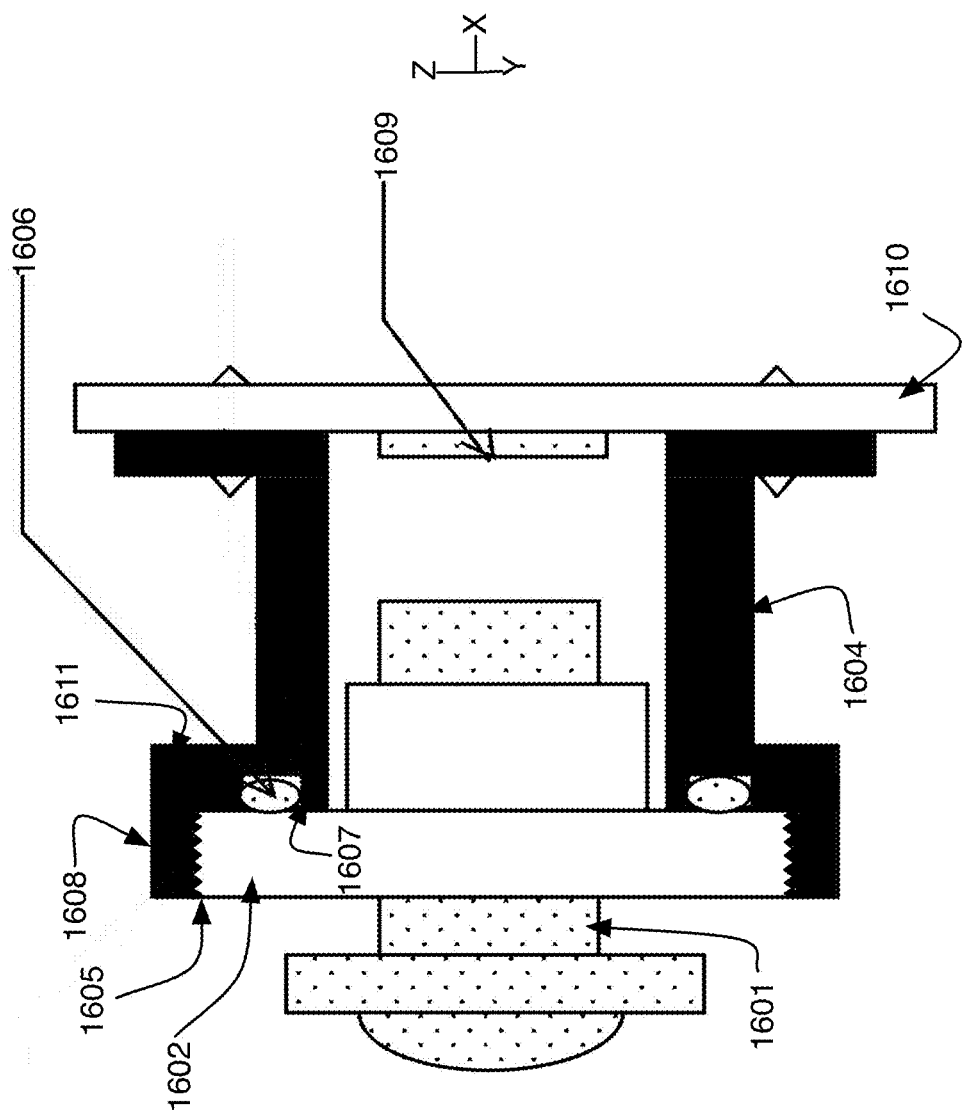
FIG. 16 shows a second embodiment including an O-ring seal.

In another embodiment shown in FIG. 16, an O-ring seal 1606 is included in a groove 1607 in the flange 1611 of the lens holder 1604. The alignment of the lens body 1601 with the substrate 1610 and the image sensor 1609 is determined by the mating of the surfaces of the lens holder flange and the lens body flange 1602. The lens body and lens holder are further aligned and held together with mating threads 1605 machined into the edge of the lens body flange 1602 and in an extension 1608 on the lens holder flange. The seal 1606 is made of a compressible material as discussed with FIG. 15.

Figure 17:
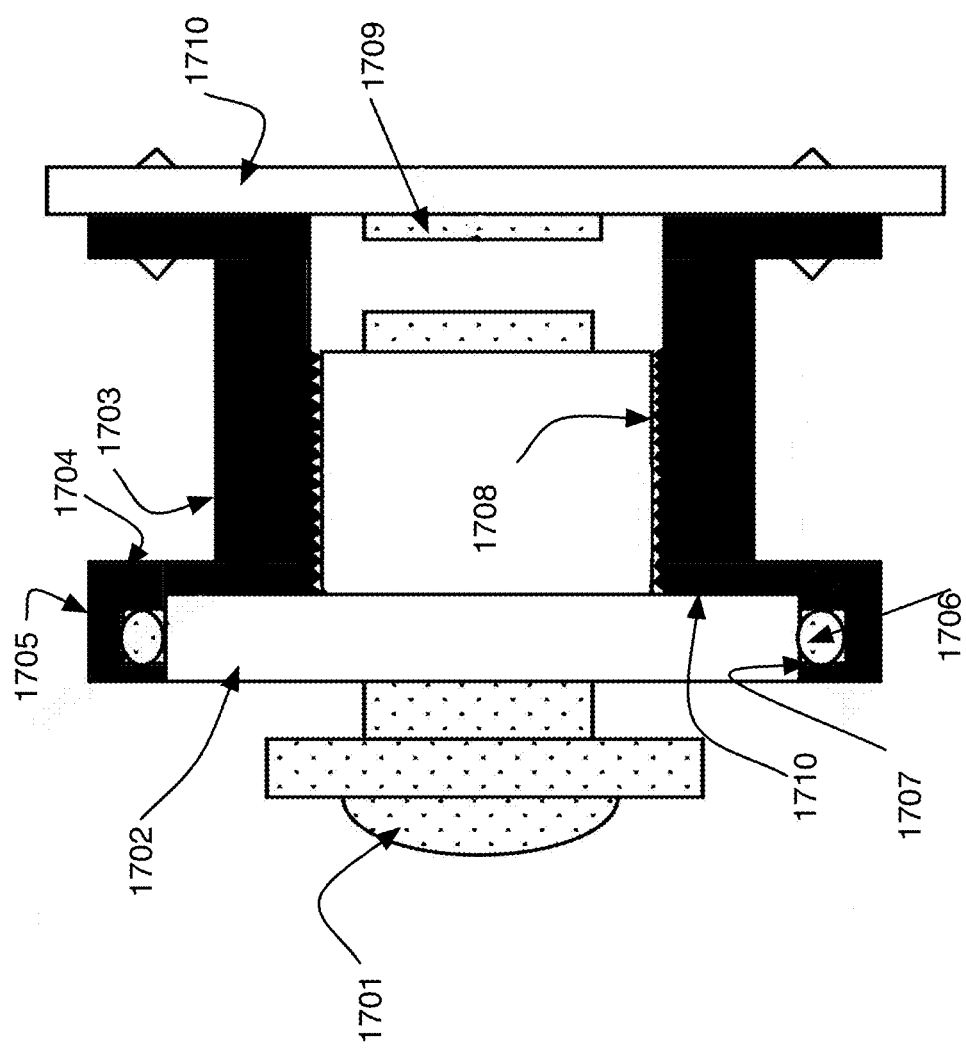
FIG. 17 shows a third O-ring embodiment.

Another embodiment shown in FIG. 17 provides an environmental seal 1706 located in a cavity 1707 located in an extension 1705 of the lens holder flange 1704. The lens holder 1703 and the lens body 1701 are held together and aligned to the substrate 1710 and the image sensor 1709 by use of threads 1708 milled in the inside edge of the lens holder and the outside edge of the lens body. The alignment of the focal plane of the lens and the image plane of the sensor 1709 is defined by mating reference surfaces 1710 of the lens body flange 1702 and the lens holder flange 1704 and by the threaded reference surfaces mating at 1708.

Figure 18:
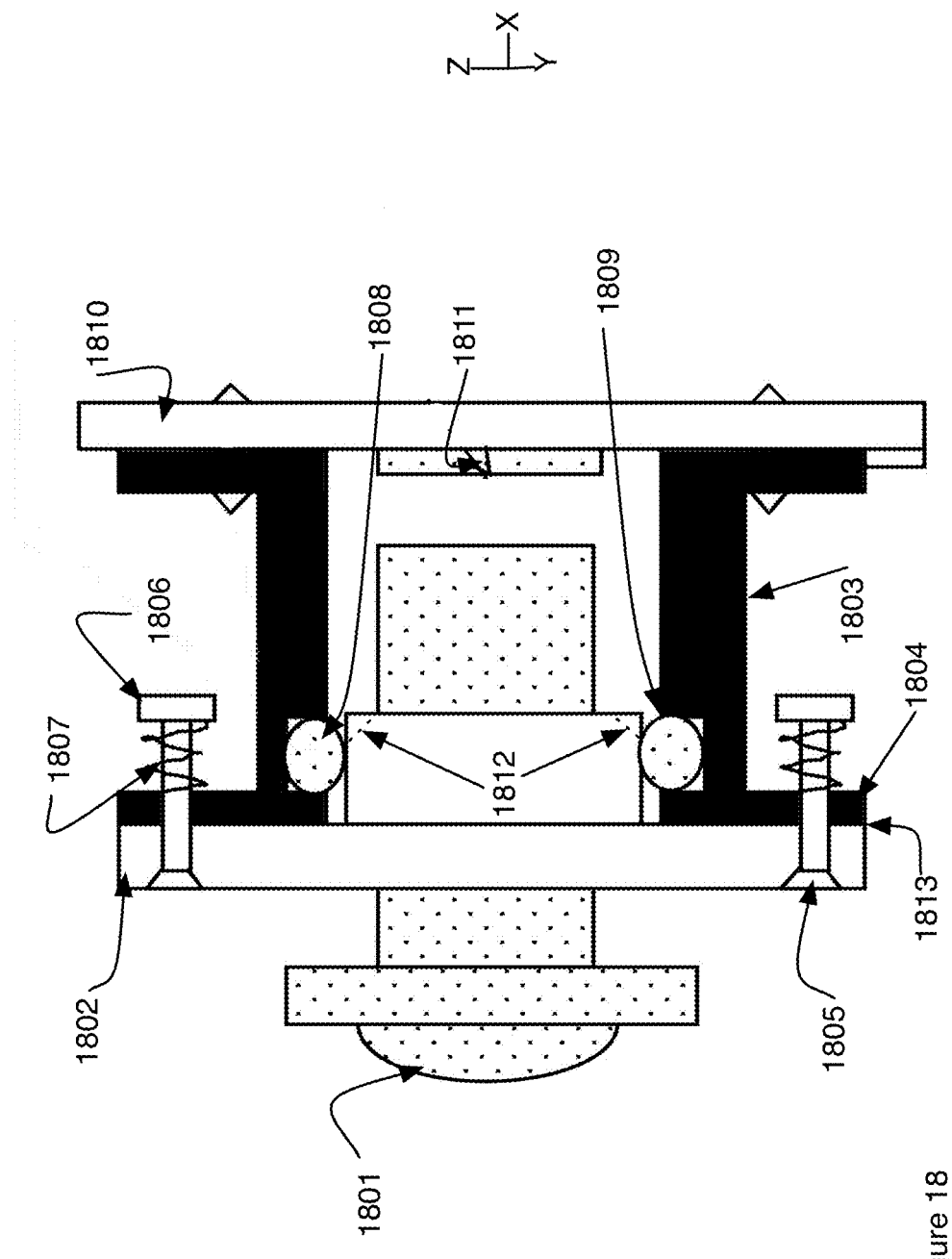
FIG. 18 shows an O-ring embodiment using spring loaded connector pins.

In another embodiment shown in FIG. 18, The lens body 1801 is held in contact with the lens holder 1803 through use of spring 1807 loaded pins 1806 that fit through openings 1805 in both the lens holder flange 1804 and the lens body flange 1802. The configuration and functioning of the spring loaded pins is as already discussed in conjunction with FIGS. 8 and 9 above. The environmental seal is provided with an O-ring 1808 embedded in groove 1809 located in the inner surface of the lens holder 1803. The lens body may optionally include beveled edges 1812 to aid in insertion of the lens body into the lens holder. The alignment of the focal plane of the lens with the image plane of the image sensor 1811 is determined by the mating reference surfaces 1813 of the lens holder flange 1804 and the lens body flange 1802.

Figure 19:
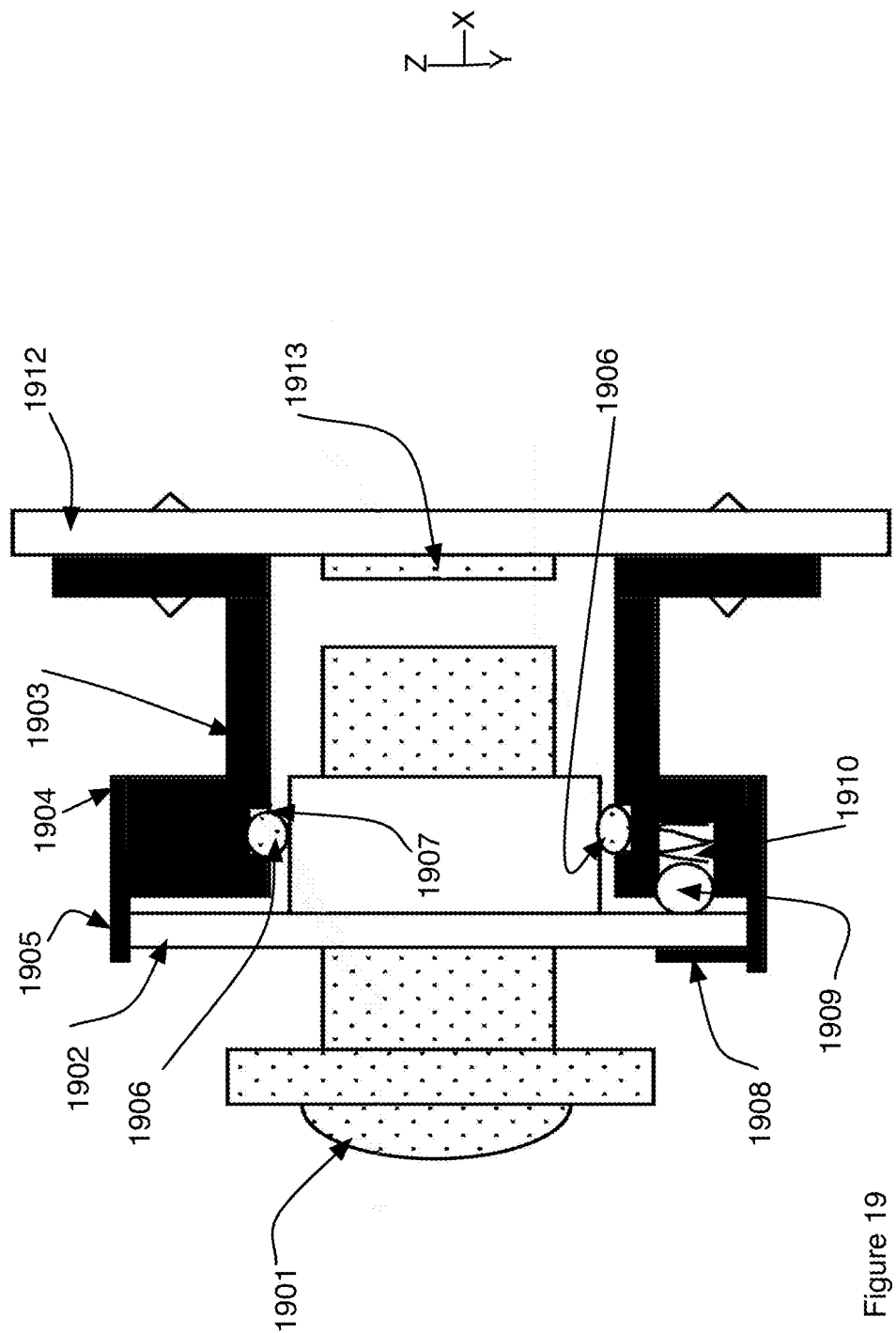
FIG. 19 shows an O-ring embodiment and spring loaded reference spheres.

In another embodiment shown in FIG. 19 and environmental seal 1906 is added to a connection system analogous to that already discussed in conjunction with FIGS. 10 and 11 above. The embodiment is comprised of a lens body 1901 and a lens holder 1903. The lens body includes a flange 1902. The lens holder 1903 includes a flange 1904. The lens holder flange 1904 further includes at least two structures (only one of which is shown in FIG. 19) to engage the flange 1902 of the lens body. The structure is comprised of a cavity 1910 in which is located a spring-loaded ball 1909. The structure on the lens holder flange further includes an edge guide 1905 that is perpendicular to the lens holder flange 1904. The structure further includes a tab 1908. When the lens body is installed in the lens holder, mating surfaces 1911 determine the alignment of the lens body 1901 and therefore the lens with the substrate 1912 and the image plane of the image sensor 1913. An environmental seal is formed upon insertion of the lens body into the lens holder through use of an O-ring 1906 that is enclosed in a groove 1907 located in the lens holder flange 1904.

Figure 20:
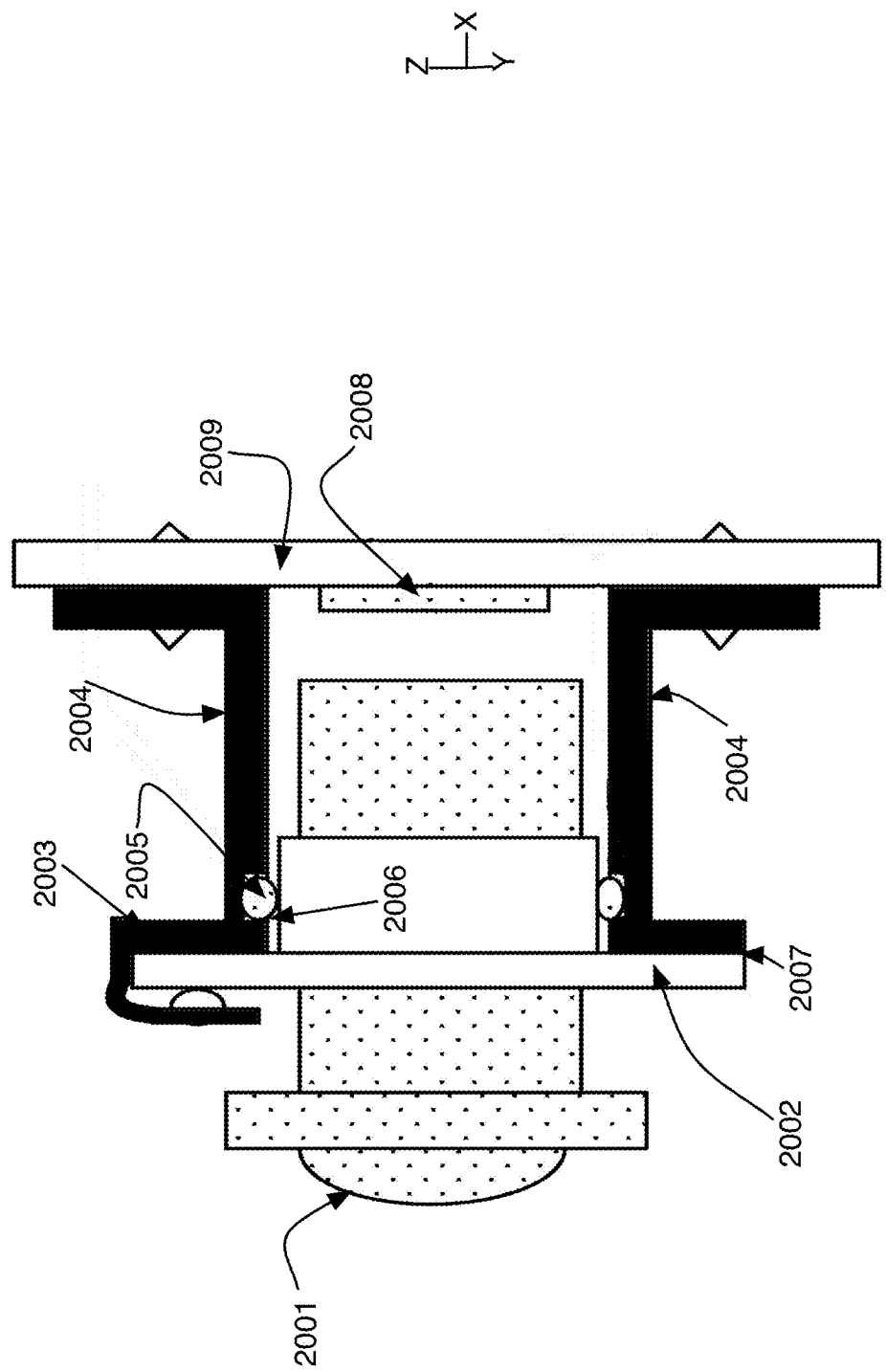
FIG. 20 shows an O-ring embodiment with reference spheres as shown in FIG. 12.

Similarly an environmental seal may be added to the lens mount of FIGS. 12 and 13 by the additional embodiments shown in FIG. 20. The lens body 2001 mates with a lens holder 2004 and aligns the lens body with the substrate 2009 and the images sensor 2008 when the surfaces 2007 of the lens body flange 2002 and the lens holder flange 2003 are in contact as shown. The environmental seal is provided by an O-ring 2005 located in a groove 2006 that is milled in the inner surfaces of the lens holder 2004.

Electrical Interface

More advanced lenses incorporate active elements requiring electrical power and control signals to operate. Examples include auto-focus elements using liquid technology manufactured for example by Parrot société anonyme (sa) of France, or liquid crystal based element manufactured by LensVector Inc, in USA. It is also possible to incorporate variable aperture or shutter, zoom and anti-vibration features driven by various motors or actuators in the lens body to further enhance the functionality of the lens. In all these cases, electrical power must be provided from the camera PCB board/substrate to the lens body. It may also be necessary to establish electrical communication between the lens body and the lens holder. In traditional film and digital SLR cameras, the electrical contacts are provided by a set of small contact pads located near the bottom of the lens body. A corresponding set of spring loaded contact pins is located inside the camera body. The prior art design requires that the lens orientation be controlled to a specific angle for the proper function of the electrical contacts. The present invention provides a method for achieving the required electrical contacts between the lens holder and the lens independent of the lens orientation. In the present invention a variety of means for making electrical contacts are described that may be used with the variety of lens body and lens holder designs already discussed including both the versions with and the version without environmental seals.

Figure 21:
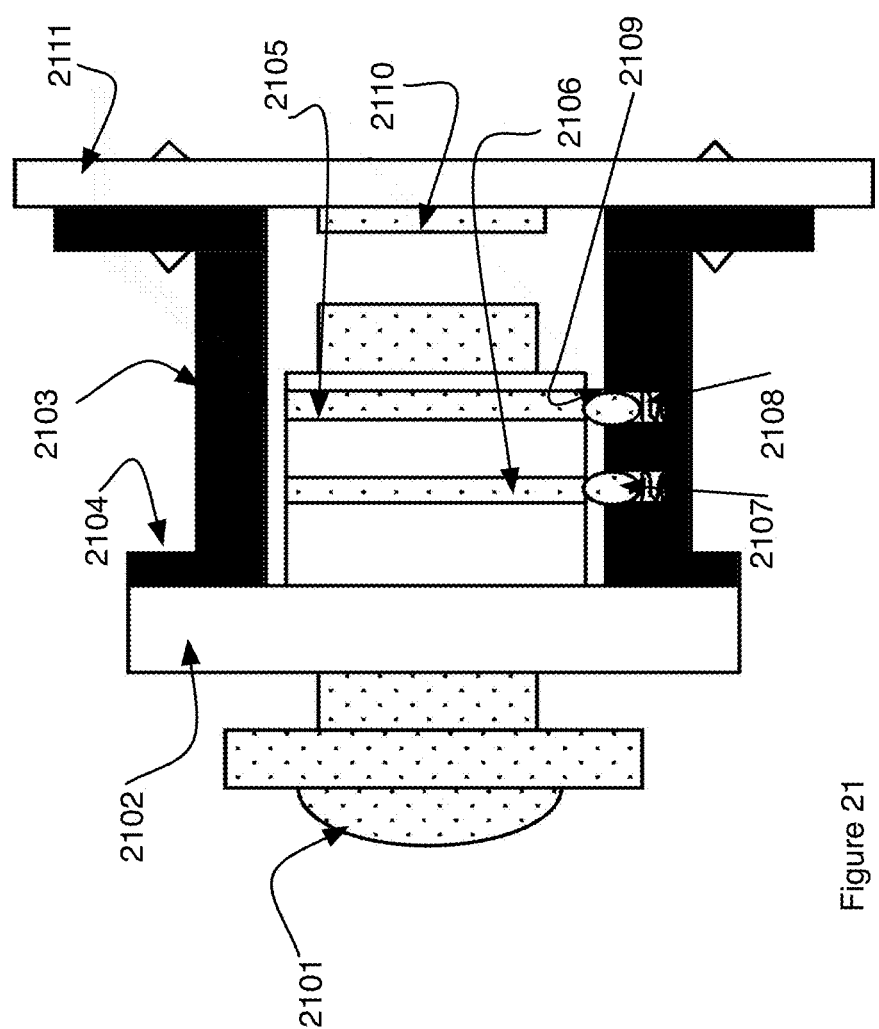
FIG. 21 shows an embodiment further including electrical contacts between the lens body mount and the lens holder.

FIG. 21 shows the preferred embodiment. Electrical conducting bands 2105, 2106 are formed around the outside diameter of the lens body 2101. The bands can be made from any suitable conducting material non-limiting exemplary materials include copper or aluminum. The bands can be made in the form of rings and attached to the outside diameter of the lens body or electro-plated directly on the lens body. Internal connections (not shown) are made from these bands to the active elements (also not shown) inside the lens body. The number of conducting bands depends in the number of connection required. Only two bands are shown in the figure. A matching set of spring loaded contact pins 2107, 2108 or conductive balls are located on the inner diameter 2109 of the lens holder 2103. The electrical pins are aligned with the corresponding bands when the lens is installed inside the lens holder. Electrical contacts are then achieved between the lens holder and lens body. Because the conducting bands are all around the outer diameter of the lens body, shown here in cross-section, the electrical contact is maintained independent of the lens body rotational orientation. The user can install the lens in all orientations (limited by the retaining mechanism) without aligning the lens in a specific angle. There are further electrical connections (not shown) between the lens holder and the substrate 2111. The substrate may then include active elements that control functionality included in the lens. Non-limiting examples of the functionality includes auto-focus, stabilization and the like. The electrical connections may also be used to provide identification of the lens included in the lens body to inform the image sensor 2100 and the associated image acquisition electronics of the type or even the particular lens that is attached.

In one embodiment information of the particular lens and lens parameters is encoded in a non-volatile memory device located in the lens body and the electrical connectors provide means to transfer that information to the circuitry on the substrate. Non-limiting exemplary memory devices include the 1-Wire® and iButton® devices sold by Maxim Integrated Products of Sunnyvale, Calif. 1-wire and iButton are registered trademarks of Maxim Integrated Products. In one embodiment the information is a part number of the lens that includes focal length and other optical properties. In another embodiment the encoded information includes serial number for the lens. In another embodiment the encoded information includes correction factors to allow correction for aberrations in the image acquired by the image sensor. Such corrections would be specific to the lens used. The lens properties and correction factors are encoded in the memory device after manufacturing and calibration of the lens in the lens body.

The embodiment is shown with one of the several lens body and lens holder combinations already discussed. Parts now familiar include the lens body 2101, lens holder 2103, the flange on the lens body 2102 and the corresponding flange on the lens holder 2104. Alignment of the lens with the sensor is as already discussed. All other embodiments of the lens body and lens holder already discussed can further include electrical contacts.

Figure 22:
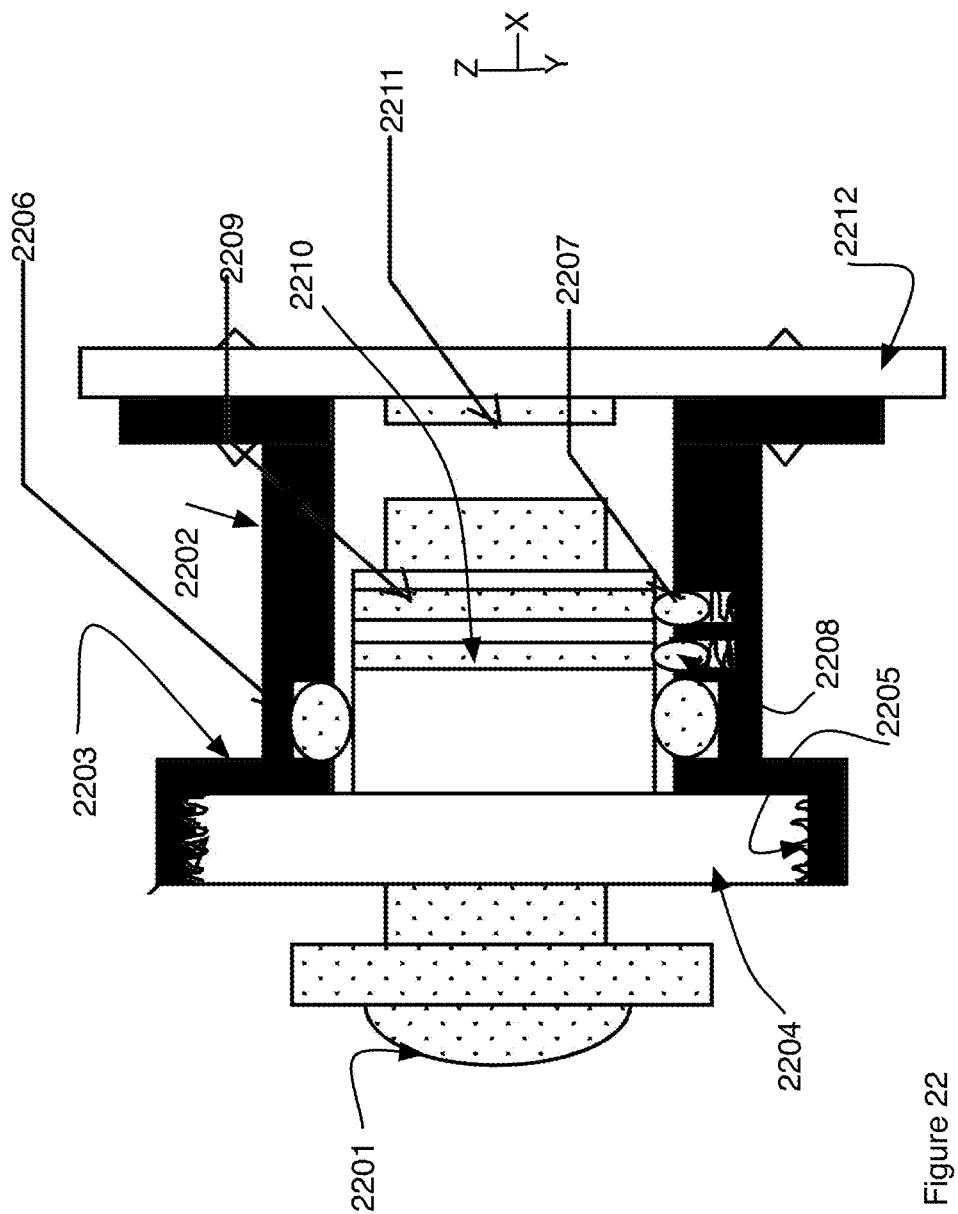
FIG. 22 shows an embodiment including both O-ring seal and electrical contacts.

FIGS. 22, 23, 24 and 25 all show other embodiments of the lens body and lens holder that further include environmental seals and now also include electrical contacts. In FIG. 22 a lens body 2201 and a lens holder 2202 include flanges 2203 and 2204 with threads 2205 incorporated at the edge of the lens body flange 2204 and corresponding threads on an extension of the lens holder flange 2203. The embodiment includes environmental seal 2206 and now electrical contacts 2207 and 2208 in the lens holder and corresponding contacts 2209 and 2210 located on the lens body. The electrical contacts allow for electrical communication of data between the lens body and the substrate 2212 including the sensor 2211 and associated electronics on the substrate (not shown).

Figure 23:
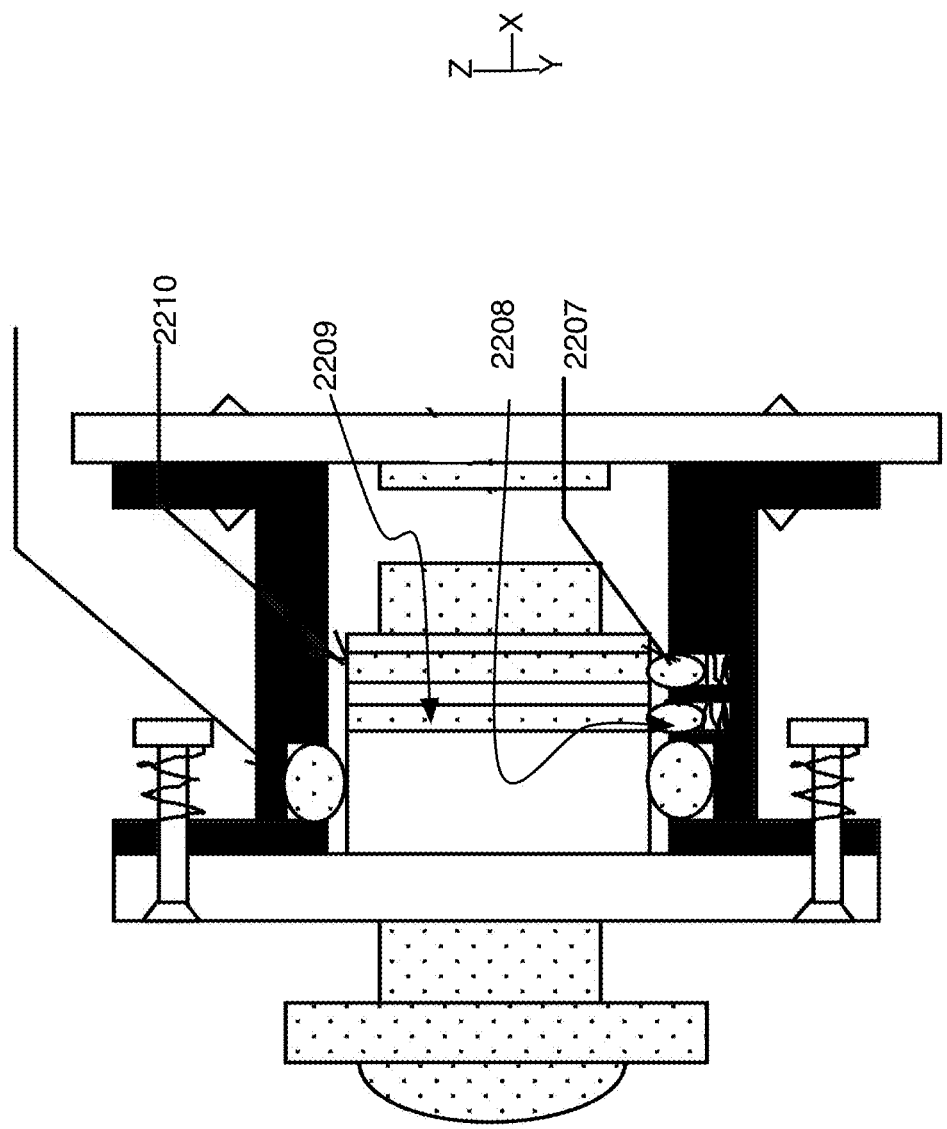
FIG. 23 shows an embodiment including O-rings, electrical contacts and spring-loaded pins.
Figure 24:
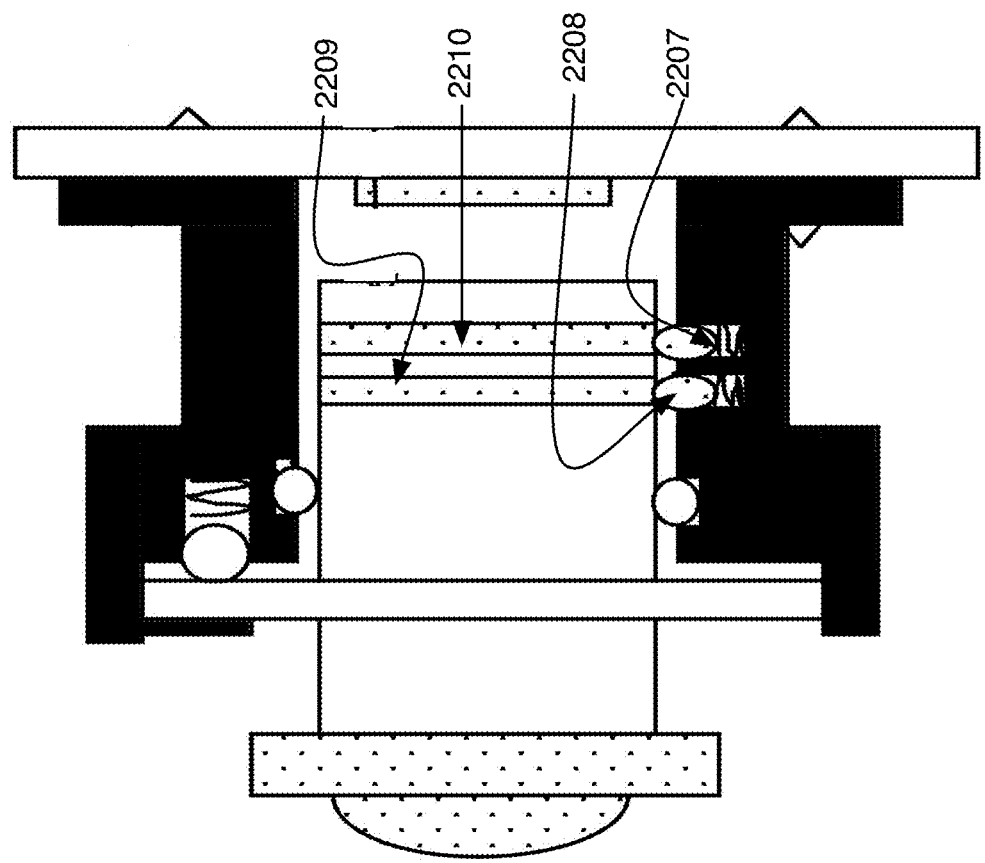
FIG. 24 shows an embodiment including O-rings, electrical contacts and spring loaded sphere reference points.
Figure 25:
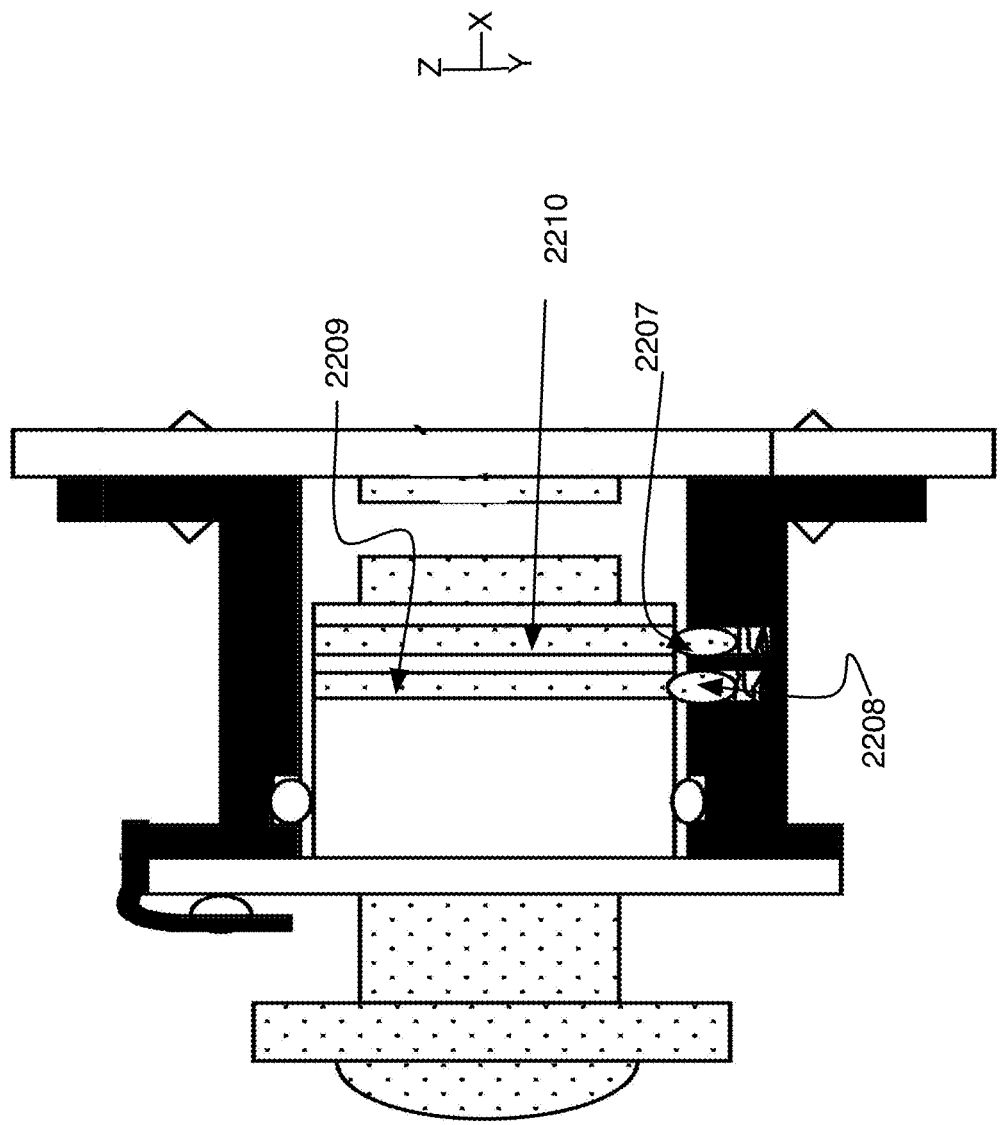
FIG. 25 shows an embodiment showing O-rings, electrical contacts and spherical reference contact points.

Similarly, FIGS. 23, 24 and 25 show other embodiments of the lens holder and lens body. Said embodiments discussed earlier but that now further include electrical contacts 2207, 2208, 2209 and 2210.

Mechanical Parts Variations

Figure 26:
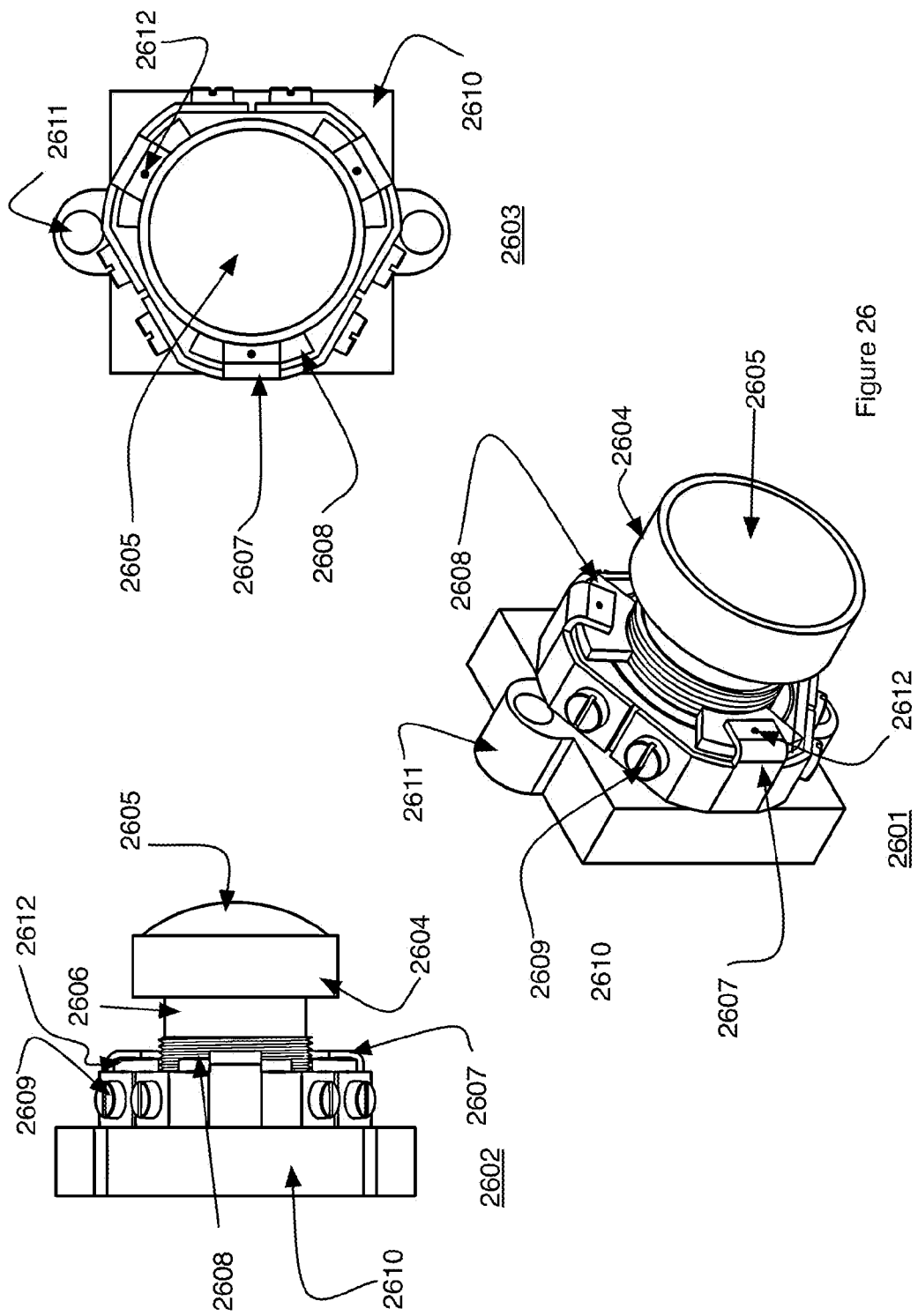
FIG. 26 shows three views of an embodiment showing a removable bracket for attachment of the lens body mount and the lens holder.

The previous embodiments all showed the lens body and lens holder as two separate units but each unit appeared as integrated components of flanges, threads and fittings. This constraint is not required. Referring to FIG. 26 three views of a mechanical variation on the embodiment shown and discussed in FIGS. 12 and 13 are shown. A perspective view 2601, a side view 2602 and a bottom view 2603 are shown. A lens body 2604 is seen attached to a lens holder 2610 the lens body includes a lens 2605 and a flange 2608 that when mated with a corresponding flange 2607 on the lens holder snaps the lens body in position in the lens holder. The lens holder flange further includes a protrusion 2612 that contacts the surface of the flange 2608 of the lens body. In one embodiment the flange 2608 on the lens body includes a dimple that when aligned with the protrusion 2612 "snaps" the lens into place with centrally aligned flanges. The flange 2607 on the lens holder is part of a separate element that is not made integral to the lens holder. The flange assembly is screwed 2609 to the lens holder to complete the assembly. The lens holder further includes bracket assemblies 2611 which are used to position and attach the lens holder to a substrate (not shown). The embodiment as shown provides alignment of the focal plane of the lens and the image plane of the sensor by fixing all three Cartesian coordinates as well as the rotational angles about all three axes. It should now be clear to one skilled in the art that all of the embodiments previously discussed may be manufactured of separate parts that are glued or screwed or otherwise attached together to create finished lens holders and lens bodies.

Isolate the Sensor

Figure 27:
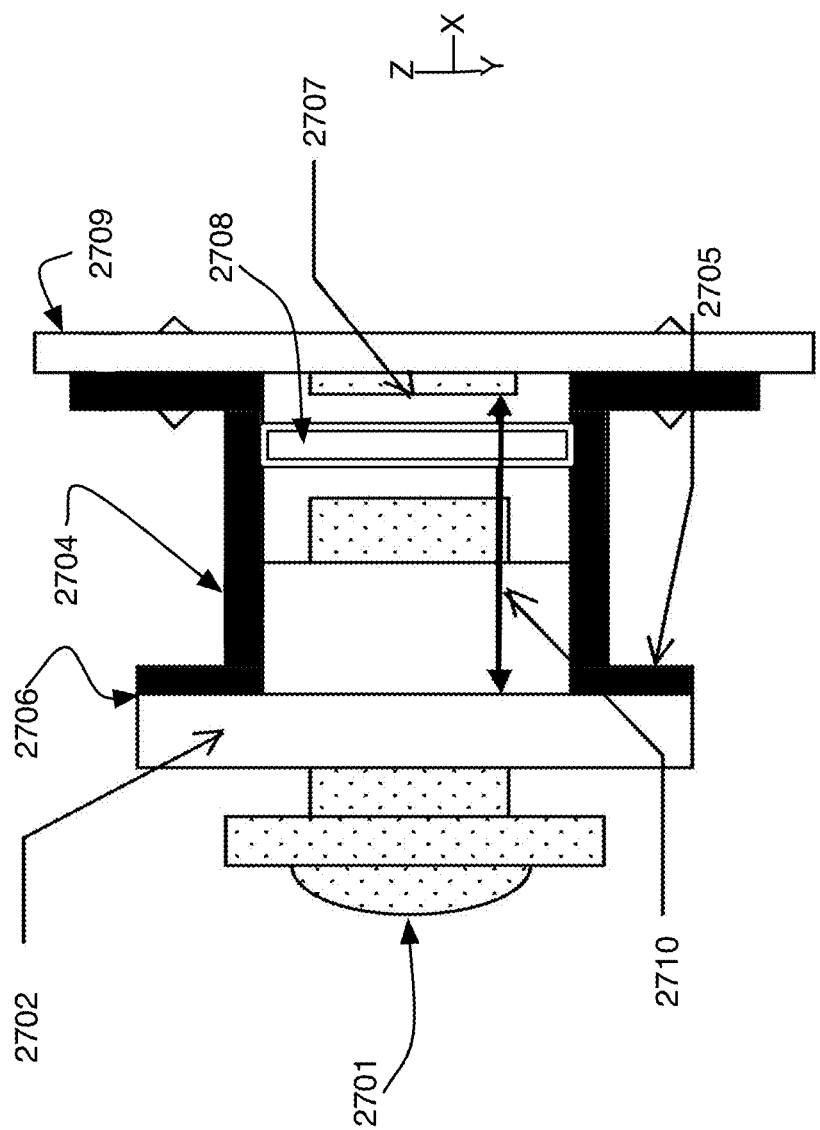
FIG. 27 shows an embodiment that includes a means to isolate the optical sensor.

In another embodiment shown in FIG. 27, the lens holder 2704 further includes a barrier 2708 that isolates the substrate 2709 and the sensor 2707 from the outside environment when the lens body 2701 is removed from the lens holder when, for example, changing lenses. Non-limiting exemplary material for the barrier 2708 include glass and optical grade plastics know in the art. The embodiment shown for the lens body and lens holder include the now familiar components of a lens body 2701, a lens holder 2704 a flange on the lens holder 2705 and flange on the lens body 2702 such that when the flanges meet 2706 the distance 2710 and orientation of the lens with respect to the image sensor 2707 are fixed. Ideally they are fixed such that the focal plane of the lens overlaps the image plane of the sensor. In the preferred embodiment, the optical path length (not the physical length) from the lens holder flange reference surface to the image surface of the sensor is the same as the distance from lens body flange reference surface to the focal plane of the lens. The additional embodiment of the barrier can be optionally added to all previously discussed variations of lens holders and lens bodies.

Figure 28:
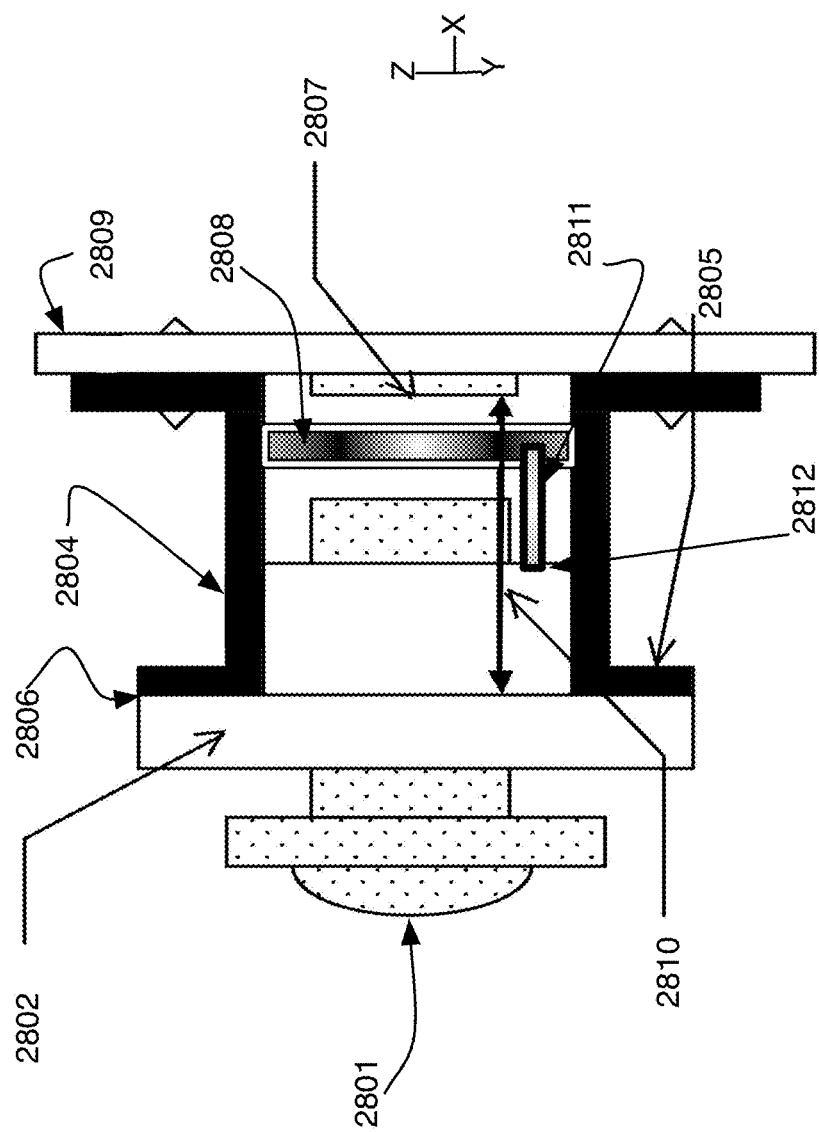
FIG. 28 shows an embodiment that isolates the optical sensor using a mechanical shutter.

In another embodiment shown in FIG. 28, the fixed barrier of FIG. 27 is replaced with a mechanically actuated barrier 2808. The barrier is actuated by a lever 2811 that makes contact 2812 with the lens body 2801 upon insertion of the lens body 2801 into the lens holder 2804. In this embodiment the barrier 2808 is closed upon removal of the lens body and is opened by the actuator lever 2811 when the lens body is inserted. Non-limiting exemplary mechanical barriers 2808 include mechanically actuated irises and shutters as are known in the art. The embodiment includes the now familiar elements of a lens body 2801, a lens holder 2804, a flange on the lens body 2802 and a flange on the lens holder 2805. The flanges are manufactured such that when opposing surfaces are mated 2806, the distance 2810 and orientation of the lens body and therefore the lens is fixed with respect to the image sensor 2807. It should be apparent that the embodiment of the mechanically actuated barrier 2808 of FIG. 28 could be included with all variations of lens body and lens holder already discussed.

Non-Colinear Embodiments

Figure 29:
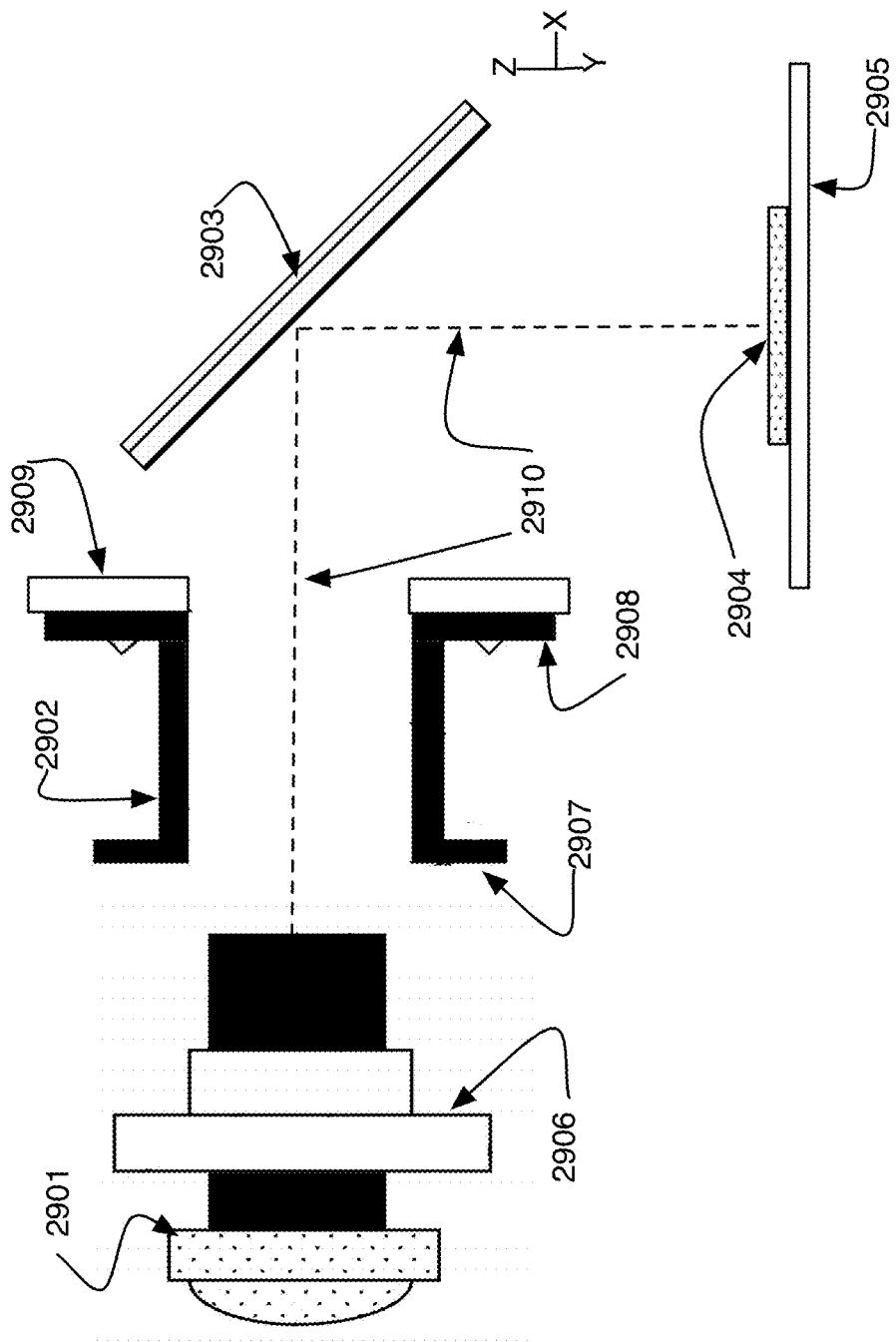
FIG. 29 shows an embodiment where the optical sensor is off-axis.

Referring now to FIG. 29 a non-colinear embodiment is shown. The embodiment comprises as in all previous embodiments a lens body 2901 and a lens holder 2902. The lens body includes a flange 2906 said flange having at least one reference surface as previously discussed. The lens holder has two flanges 2907, 2908. The first flange 2908 attached to a substrate 2909 said substrate is fixed relative to a second substrate 2905. An image sensor is mounted on the second substrate. The embodiment further comprises a mirror 2903 that reflects the optical axis onto the image sensor. The embodiment otherwise is the same as the multitude of embodiments already discussed in that when the lens body is inserted into the lens holder the reference surfaces on each when mated will ensure alignment of the focal plane of the lens with the image plane of the sensor 2904. It should be clear that the angle in the path of the optical axis 2910 although shown in the example as a 90 degree angel could be any angle, acute or obtuse, that still allows alignment of the focal plane and the image plane. Further although shown as a plane mirror 2903. It is clear that the mirror 2903 could also be nonplanar and in fact could be an active optical element.

Safety Retainer Catch

Figure 30:
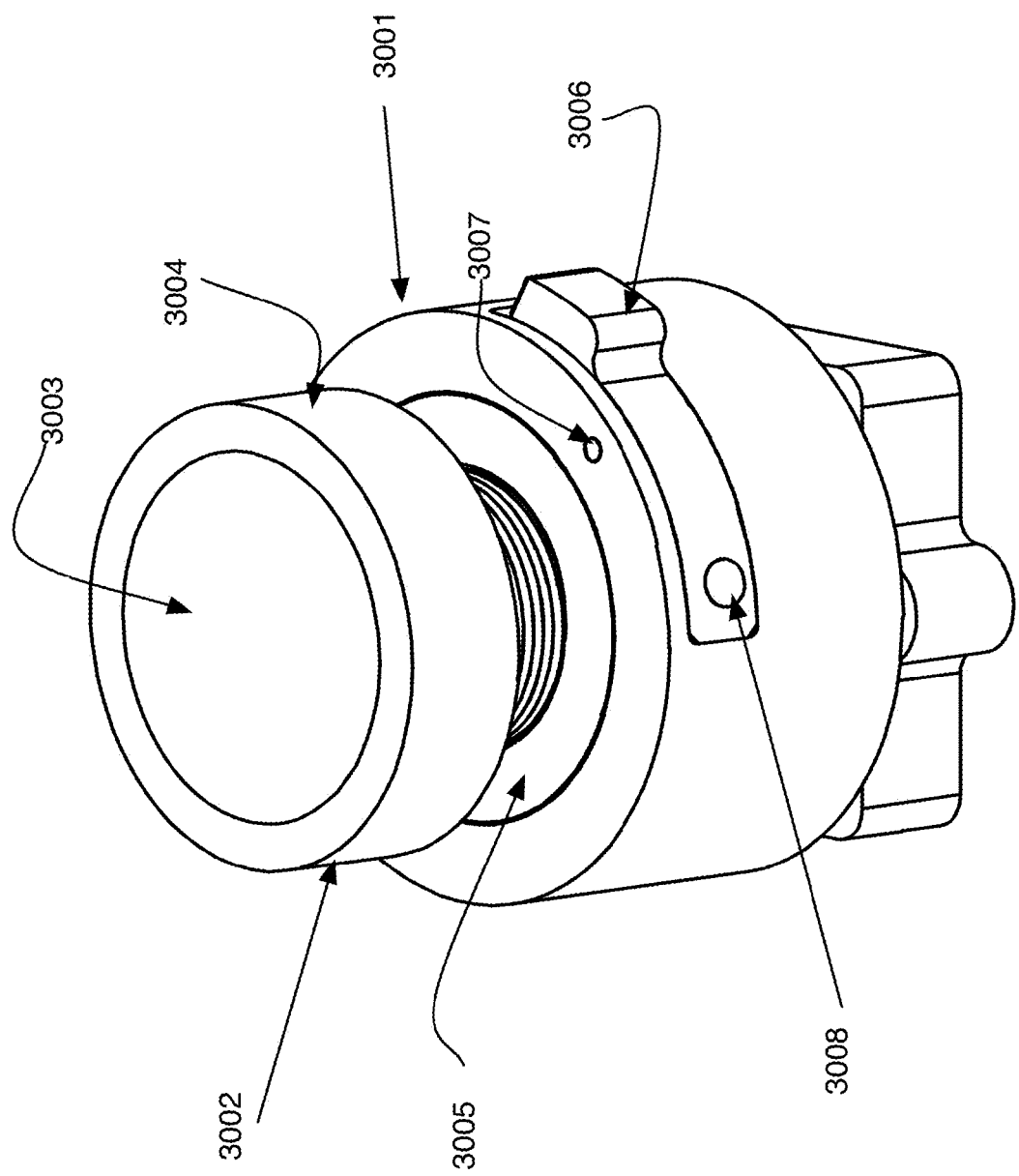
FIG. 30 shows an embodiment that includes a catch mechanism.
Figure 31:
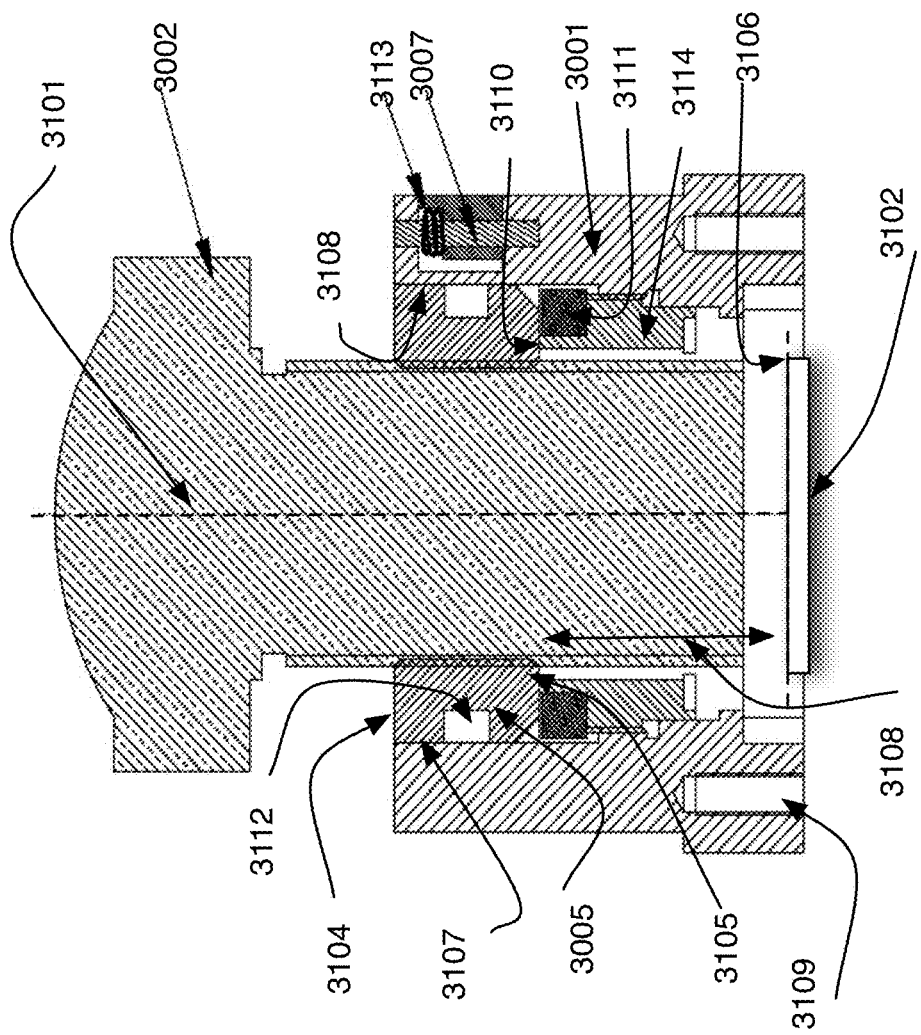
FIG. 31 shows a cross-section view of the embodiment of FIG. 30.
Figure 32:
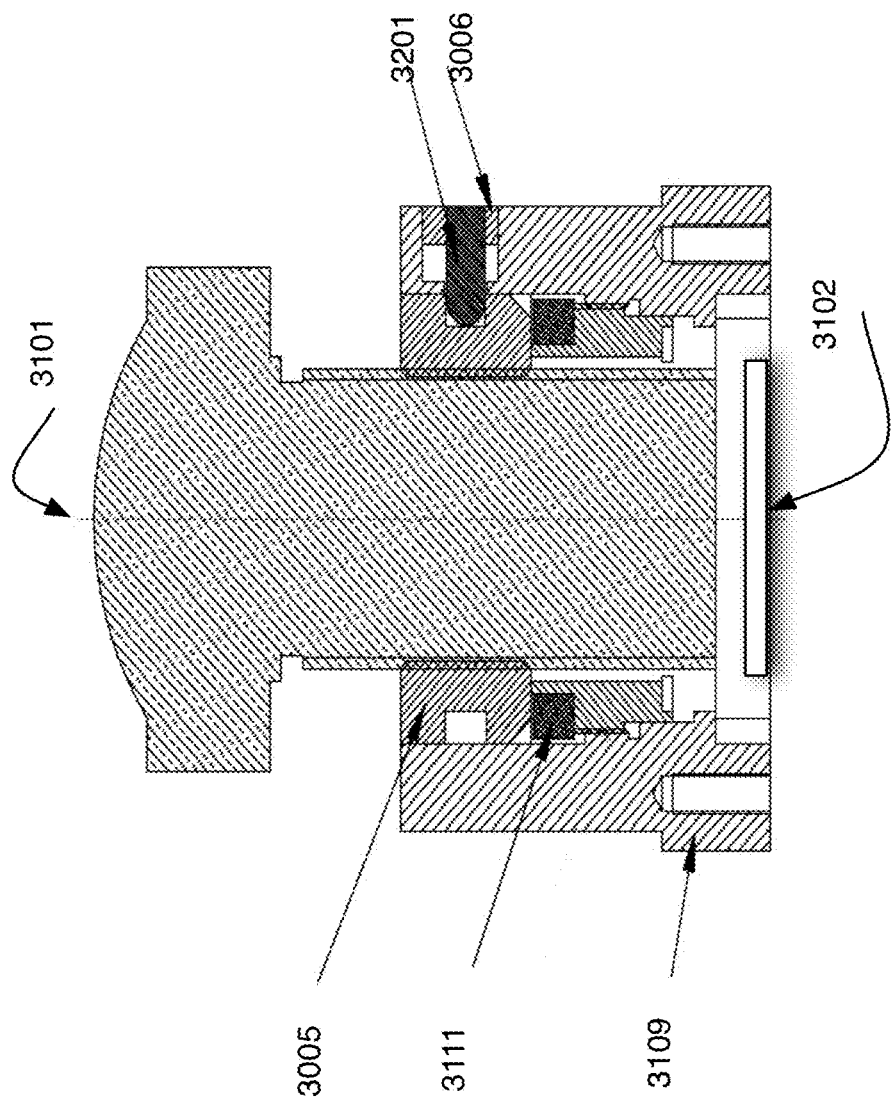
FIG. 32 shows a second cross-section view of the embodiment of FIG. 30.

In another embodiment shown in FIGS. 30-32. The lens mount further includes a safety retainer catch to ensure the lens does not fall out of the holder when subject to jarring or sudden acceleration.

Combined the lens body 3002 and lens holder 3001 form the replaceable lens mount as shown in FIG. 30. The lens mount is comprised of a lens holder 3001 and a lens body 3002. In the embodiment shown, the lens holder and lens body are both cylindrical elements shown in FIGS. 31 and 32 in cross-section views and the elements fit together concentrically. The lens body 3002 is comprised of lens elements 3003 which are fit in a central cylinder 3004 such that the optical axes 3101 of the lens elements and the central axis of the cylinder in which the lens elements are mounted are coincident. The lens body may be exchanged when a user desires to use a lens with different properties such as a different focal length. In a preferred embodiment this line is positioned to intersect the center point of the image plane of the sensor 3102. The lens body further includes a flange 3005. The flange has a top surface 3104 and a bottom surface 3105. At least one of the flange surfaces is a reference surface that is at a fixed coordinates relative to the focal plane 3106 of the lens. In this way when a lens is exchanged the replacement lens is automatically aligned such that the image formed by the lens is focused on the image plane of the sensor. In the preferred embodiment as shown, the lower surface 3105 is used as a reference surface positioned at a fixed distance 3108 from the sensor 3102 image surface such that the focal plane of the lens 3106 is located at the sensor 3102 image surface and parallel to the sensor image surface. The lens holder further includes a lens holder flange 3114 a reference surface 3110 that is positioned a fixed distance and parallel to the image plane of the sensor 3102 such that when the reference surface 3105 on the lens body meets with the reference surface 3110 on the lens holder the focal plane of the lens is coincident with the image plane of the sensor. The lens body 3002 is fit within the lens holder 3001 such that the outer surface 3107 of the flange 3005 of the lens body 3002 fits with the inner wall 3108 lens holder 3001. The inner surface of the lens holder and the outer surface of the lens body meet to align the lens within the lens holder such that the optical axis of the lens 3101 is aligned at the center point of the image plane of the sensor 3102. The image sensor 3102 is mounted to a substrate (not shown) through means already discussed above in previous embodiments. The lens holder 3001 is attached to the same substrate through using connectors through holes in the lens holder 3109 again similar to that in embodiments already discussed. The dimensions of the lens holder 3001 and the location of the lens body flange 3005 are manufactured such that when mated as shown the focal plane of the lens 3106 and the image plane of the sensor 3102 are aligned.

The lens body 3002 includes a flange 3005 that is concentric about the lens body and includes a first reference surface 3105 that is on a bottom edge of the flange 3005 and a second reference surface 3107 that is on the outer surface of the flange. The lens holder 3001 likewise includes two reference surfaces. A first reference surface 3110 is located at a known fixed distance from the image plane of a sensor 3102 and is parallel to the image plane of the sensor. A second reference surface 3108 if formed on the circumference of an inner wall of the lens holder. When the first reference surface 3105 and the second reference surface 3107 of the lens body 3002 are mated with the first reference surface 3110 and the second reference surface 3108 of the lens holder respectively the focal plane of the lens is coincident with the image plane of the sensor 3102 and the optical axis 3101 of the lens is centered on the optical sensor 3102. In another embodiment the mating of the paired reference surfaces results in the optical axis of the lens being positioned at a preferred point on the image plane of the optical sensor, said preferred point not the center of the optical sensor.

In the preferred embodiment the flange reference surface 3105 and the lens holder reference 3110 are held in intimate contact with a magnet 3111 positioned as part of the lens holder flange 3114 inside the lens holder 3001. In one embodiment the magnet is circular and circumscribes the inner surface of the lens holder and outer surface of the lens holder flange.

In other embodiments the lens body is held within the lens holder by the frictional forces between the second reference surface on the flange 3107 and the inner wall reference surface 3108 of the lens holder. In another embodiment magnets are positioned in both the lens body flange and the lens holder and the polarity of the magnets are selected such that they attract. In another embodiment the magnets are electromagnets and the attraction of the lens body to the lens holder can be released. In another embodiment the system further includes a vacuum pump (not shown) and the lens holder is partially evacuated to hold the lens body within the lens holder.

In another embodiment the flange 3005 on the lens body further includes a groove 3112 that circumscribes the outer edge of the flange located in the second reference surface of the flange. The lens holder further includes a catch. The outer components of the catch system can also be seen in FIG. 30. In the embodiment shown the catch includes a circular cylinder (or a pin) 3201 (FIG. 32), the first end of which 3008 is seen in FIG. 30. The catch is attached to a lever actuator 3006 that is hinged 3007 such that when the actuator is pressed the catch is pulled away from the groove thereby releasing the lens body from the lens holder for removal or replacement of the lens body with another lens body. In another embodiment the actuator and lever are positioned such that the lever is pulled to release the lens body form the lens holder. The inner workings of the catch can be seen in the cross section view of FIG. 31. The hinge 3007 is seen to include a spring 3113 that is tensioned to hold the catch cylinder 3201 within the groove 3112 best seen in FIG. 32. When the actuator lever 3006 is actuated or pressed the catch cylinder 3201 is withdrawn from the groove to allow the lens body to be lifted and removed from the lens holder. In one embodiment the catch is used to hold the lens body within the lens holder and the magnet 3111 is not included. In another embodiment a catch is include in more than one position around the lens holder. In one embodiment, not shown, two catch release mechanisms are included, one on each opposite side of the lens holder such that the actuator is squeezed releasing both mechanisms. In another embodiment the catch cylinders in the paired mechanisms are tapered such that the spring loading of the catch pushes the lens body down into the lens holder and thereby causing intimate contact between the reference surfaces 3105 and 3110.

Encoded Lens Bodies

Additional embodiments include a system to encode the lens bodies such that lens properties particular to the lens body positioned within the lens holder can be detected. Referring now to FIGS. 33-38 means for marking a lens body for identification are shown. The design characteristics of a lens can be calculated using suitable optical design software such as that provided by Zemax® provided by Radiant Zemax, LLC or Code V® Synopsys, Inc. (Zemax and Code V are registered trademarks of their respective providing companies). The actual performance of a lens is determined by both design and manufacturing limitations. Manufacturing tolerances causes a lens to lens performance variation. Once the actual performance of a lens is known, it is possible to correct or compensate for the lens performance limitations due to both design and manufacturing in the imaging processing pipeline. The pipeline includes the on board processing in the image sensor, the Digital Signal Processor (DSP) or Image Signal Processor (ISP) which processes the sensor output, and the post-processing once the image data is transferred to a separate standalone computer or to an internet server. Non-limiting exemplary corrections include:

1. Off-axis distortion: Lens distortion is caused by design limitations and manufacturing variations. Off-axis straight lines appear curved. If the actual lens distortion profile is known, it is possible to use geometric transformations to minimize or cancel the distortion effect.
2. Off-axis brightness falloff: Image brightness falls off with field angle due to both design and manufacturing variations. Once the falloff function is known, it is possible to apply a position dependent gain function to compensate for the lens falloff.
3. Chromatic aberrations: Light at different wavelength is focused on the different focal plane (axial chromatic aberration). At off-axis field angles, the lateral position of the focal point also depends on the wavelength (lateral color). Corrections of both types of chromatic aberrations are possible once the actual lens performance is known.
4. Sharpness: Lens sharpness is limited by design and manufacturing tolerances. The sharpness can be described by the MTF (modulation transfer function) or PSF (point spread function) of the lens, which varies from point to point, on the focal plane. Once the actual PSF or MTF of a lens is measured for all locations on the focal plane, it is possible to apply de-convolution type algorithms to recover the information loss due to lens limitations.
5. Flare/ghosting: All practical lenses have some flare or ghosting due to design and manufacturing process limitations. If such limitations can be measured beforehand, it is possible to apply imaging enhancement techniques in the processing pipeline to mitigate the image degradation due to lens flare/ghosting.

The actual lens performance can be individually measured and characterized using suitable optical test equipment. A unique lens ID (such as a serial number) is then generated for each manufactured lens body. A database is then created to associate the unique lens ID to its design and measured characteristics. The lens body is marked by its unique ID using various techniques, nonlimiting examples include: RFID, magnetic encoding, optical encoding, barcode, electronic and mechanical interface. A corresponding reading device on the lens holder or camera body side reads the ID of the lens body. The reading device can also be the image sensor if an optical identification code is imprinted on the bottom surface of the lens body. Based on this ID, the processing unit located either in the camera body or separate from the camera body can retrieve the design and measured characteristics of the lens from the database. This database can reside within the lens barrel or the camera body via a pre-programmed memory chip. Alternatively the camera can retrieve this data from a centralized database located on a server on the Internet. The camera processor unit can take advantage of this data to optimize the output image quality of the image file, for example, by compensating the known aberrations of the lens body using various well-known image processing algorithms.

In another embodiment the image data file from the camera sensor includes the serial identification of the lens and the images are corrected in a processor separate from the camera.

In a preferred embodiment the lens barrel has a barcode. This barcode can be implemented as series of modulation bars on the barrel surface perpendicular to the lens axis. When the lens barrel is inserted into the lens holder, a barcode reader resides on the lens holder reads the lens barrel ID by detecting the modulation of the light intensity. The design and measured characteristics associated with this unique lens ID is stored within the camera body in memory. This memory is updated as needed from a central database server on the Internet. For example, when a new lens ID is first read by the reading device and the database does not exist within the camera onboard memory, the camera updates it database by downloading the updated database from the central server using lens body ID.

In another embodiment the serial number of the lens is stored along with the image data when an image is acquired. In this manner the corrections can be applied at any time to the image file by looking up the correction data either locally or remotely stored.

Figure 33:
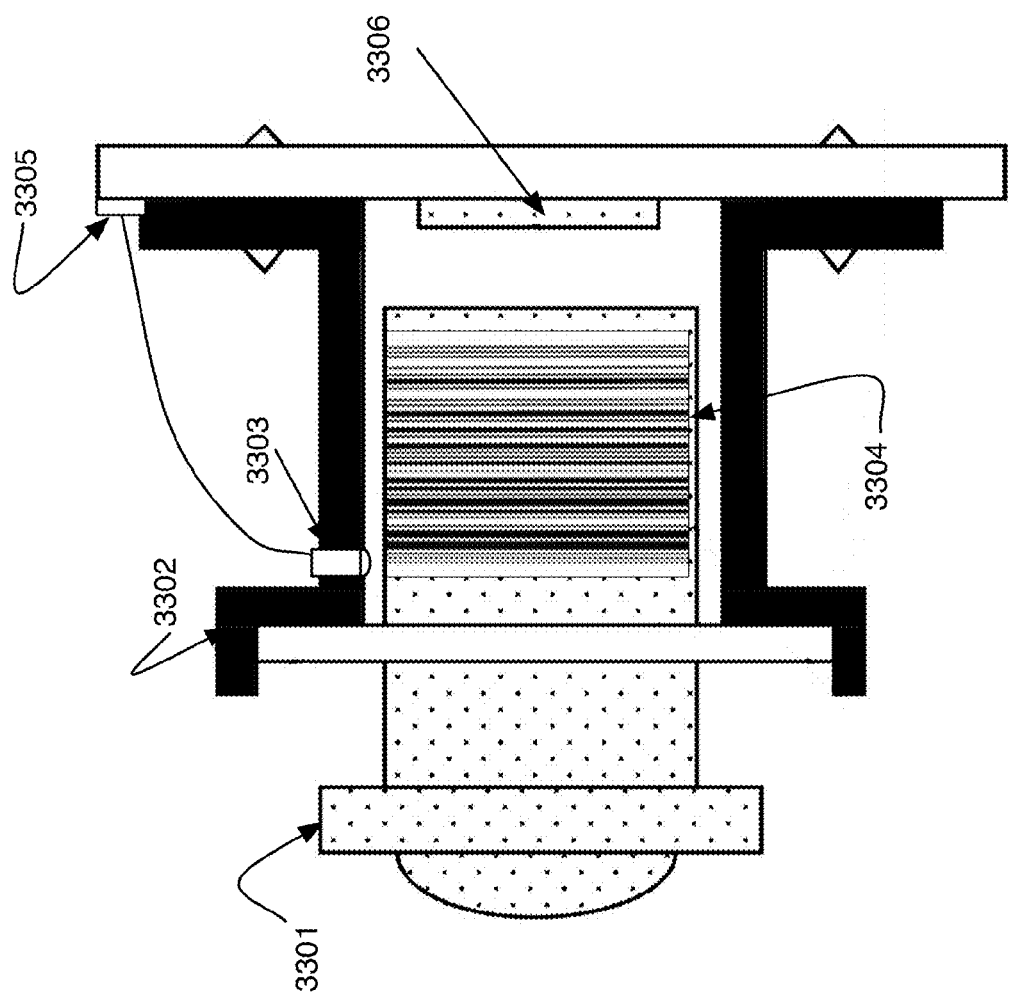
FIG. 33 shows an embodiment including a marking of the lens body for identification.

Referring now to FIG. 33 a lens mount includes a lens body 3301 that may be removably attached to a lens holder 3302. The lens holder further includes a sensor 3303 located such that as the lens body is inserted into the lens holder a bar code 3304 that is circumscribed onto the lens body is read by the sensor. The data read by the sensor 3303 is stored in a processor 3305. The processor may be located on the image sensor board or elsewhere within the imaging device. In one embodiment the bar code encodes a number to identify lens features such as focal length. In another embodiment the bar code encodes a serial number. In one embodiment the serial number is unique to the particular lens in the lens body and is linked to a database of lens parameters that may be used to correct images acquired by the image sensor 3306.

In another embodiment the optical barcode is replaced by a magnetic strip and the reader is a magnetic sensor that reads the serial number and other data that is encoded magnetically in the strip.

Figure 34:
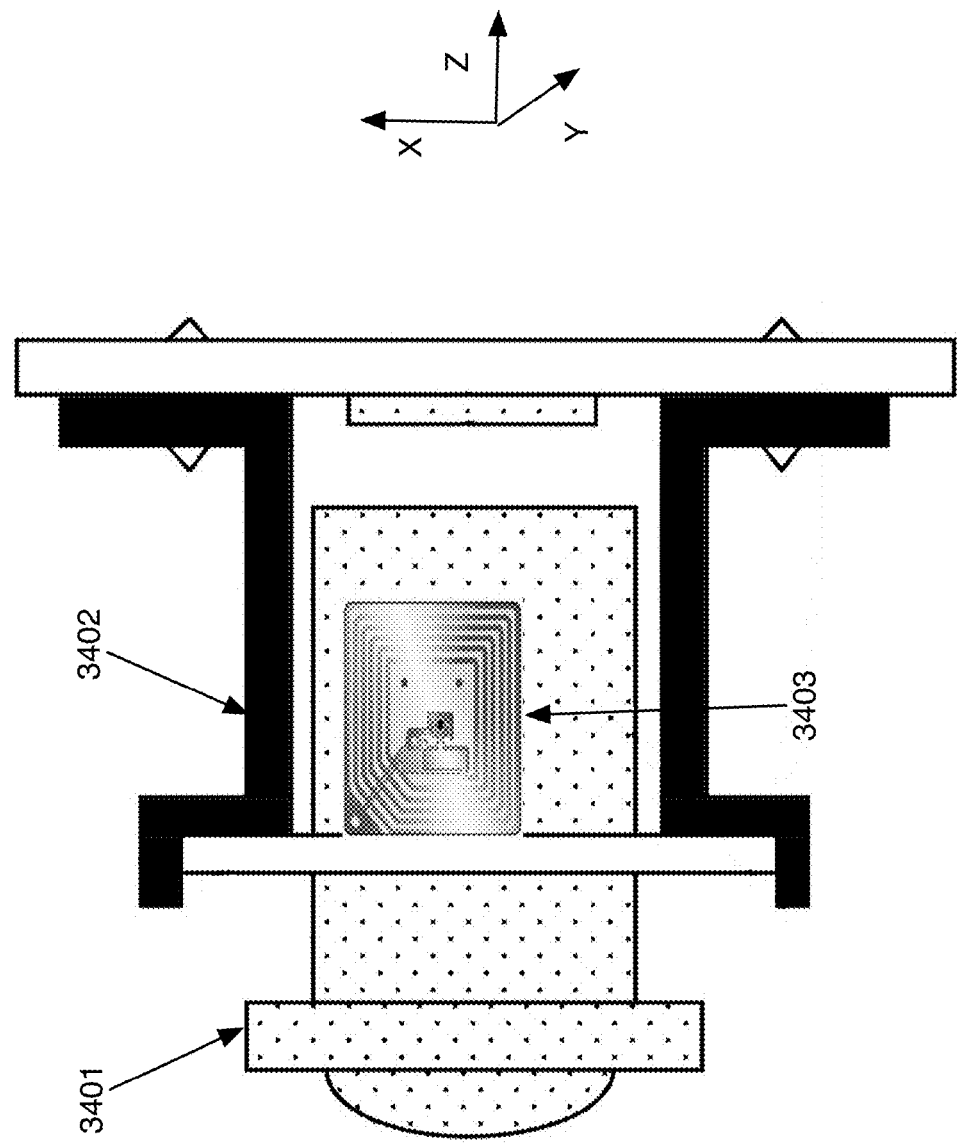
FIG. 34 shows an embodiment including an electronic marking of the lens body for identification.

In another embodiment shown in FIG. 34 the lens body 3401 includes an electronic tag 3403 that may be read by a sensor (not shown) located either within the lens mount or the camera body. The sensor may be connected directly to a reader via electrical connection through the lens holder as previously discussed or may be read wirelessly as in the case of a radio frequency identification tag (RFID) as is known in the art.

Figure 35:
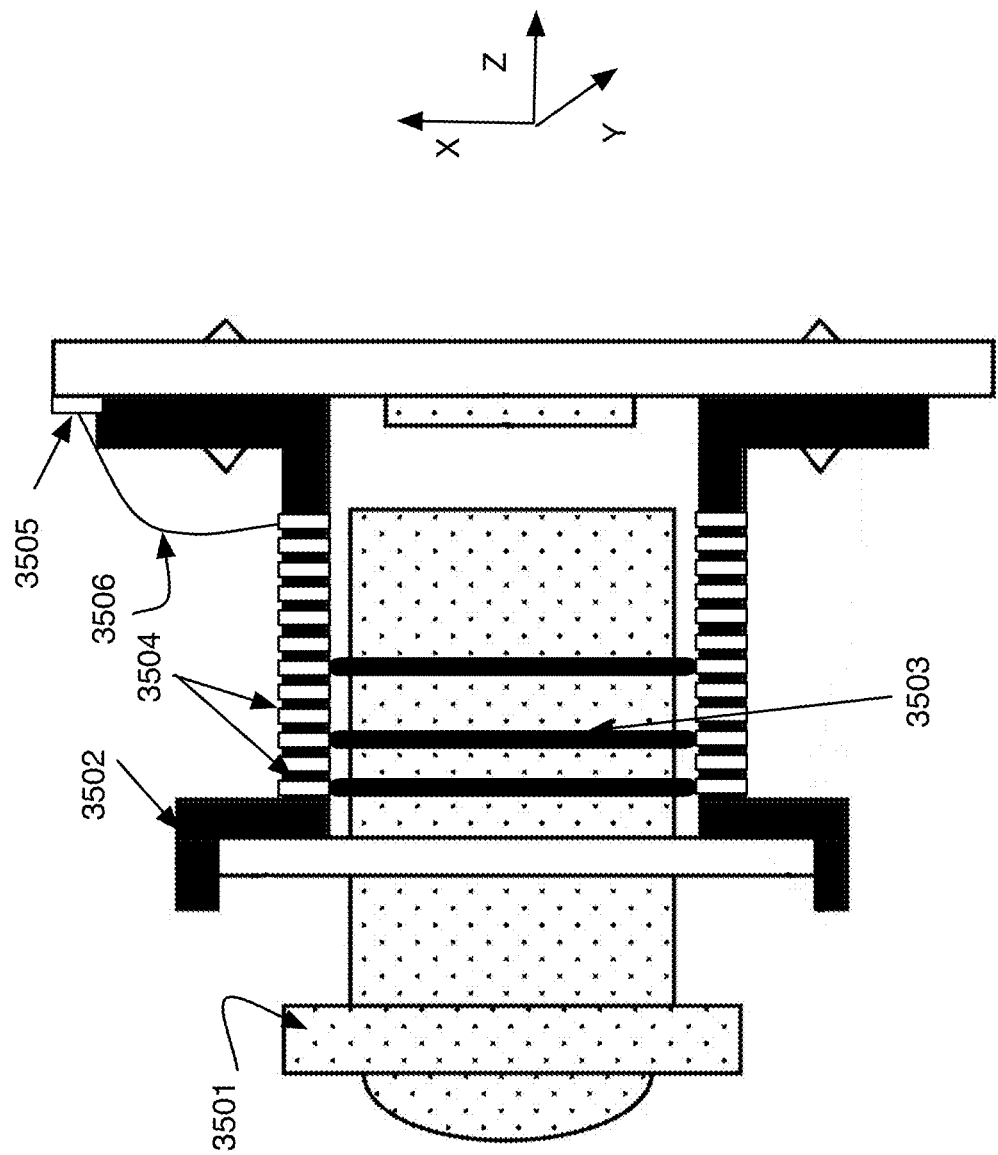
FIG. 35 shows an embodiment using mechanical switches for marking the lens body for identification.

In another embodiment shown in FIG. 35 a lens body 3501 includes mechanical key actuators tabs 3503 that trigger switches 3504 located on the lens holder 3502. The location of the actuators tabs encodes for a serial number of the lens body once inserted into the lens holder. The switches are electrically connected to a processor 3505. Only a single connection 3506 is shown in the diagram but in practice all switches would be able to be sensed.

Figure 36:
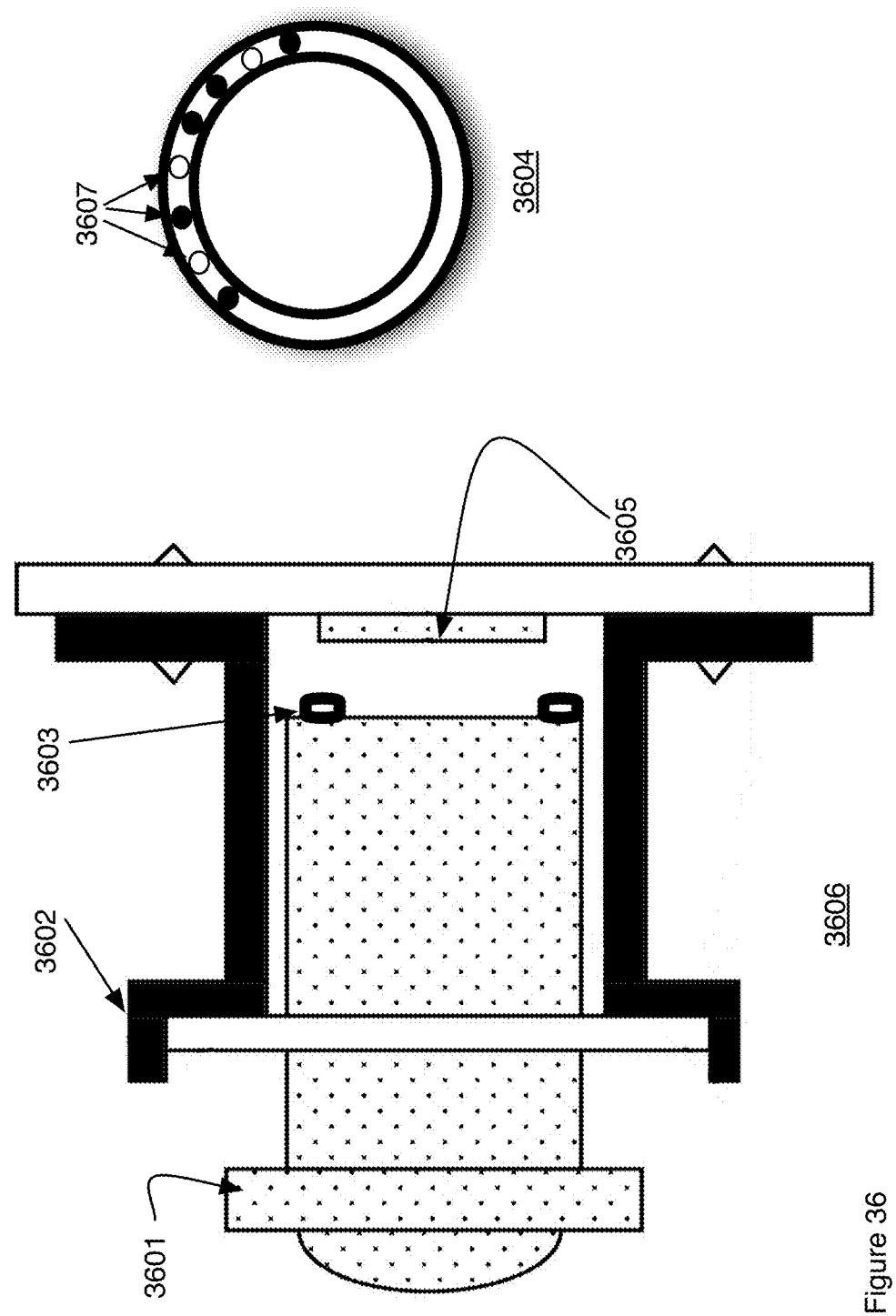
FIG. 36 shows another embodiment for marking the lens for identification.

In another embodiment shown in FIG. 36 indicia are marked on the base of the lens body. The embodiment includes a lens body 3601 and a lens holder 3602 that is located above an optical image sensor 3605. Two views are shown in the Figure: a cross-sectional view 3606 and a view 3604 of the base of the lens body. The indicia 3607 may be printed or otherwise marked onto the base of the lens body such that the sensor 3605 may read the indicia. In a preferred embodiment the indicia encode a serial number specific to the lens in the lens body 3601. In another embodiment the lens body further includes an annular lens 3603 that transfers the information contained by the indicia onto the sensor 3605. An advantage of the system is that no additional sensors are required to read the serial number of the lens encoded on the lens body.

Figure 37:
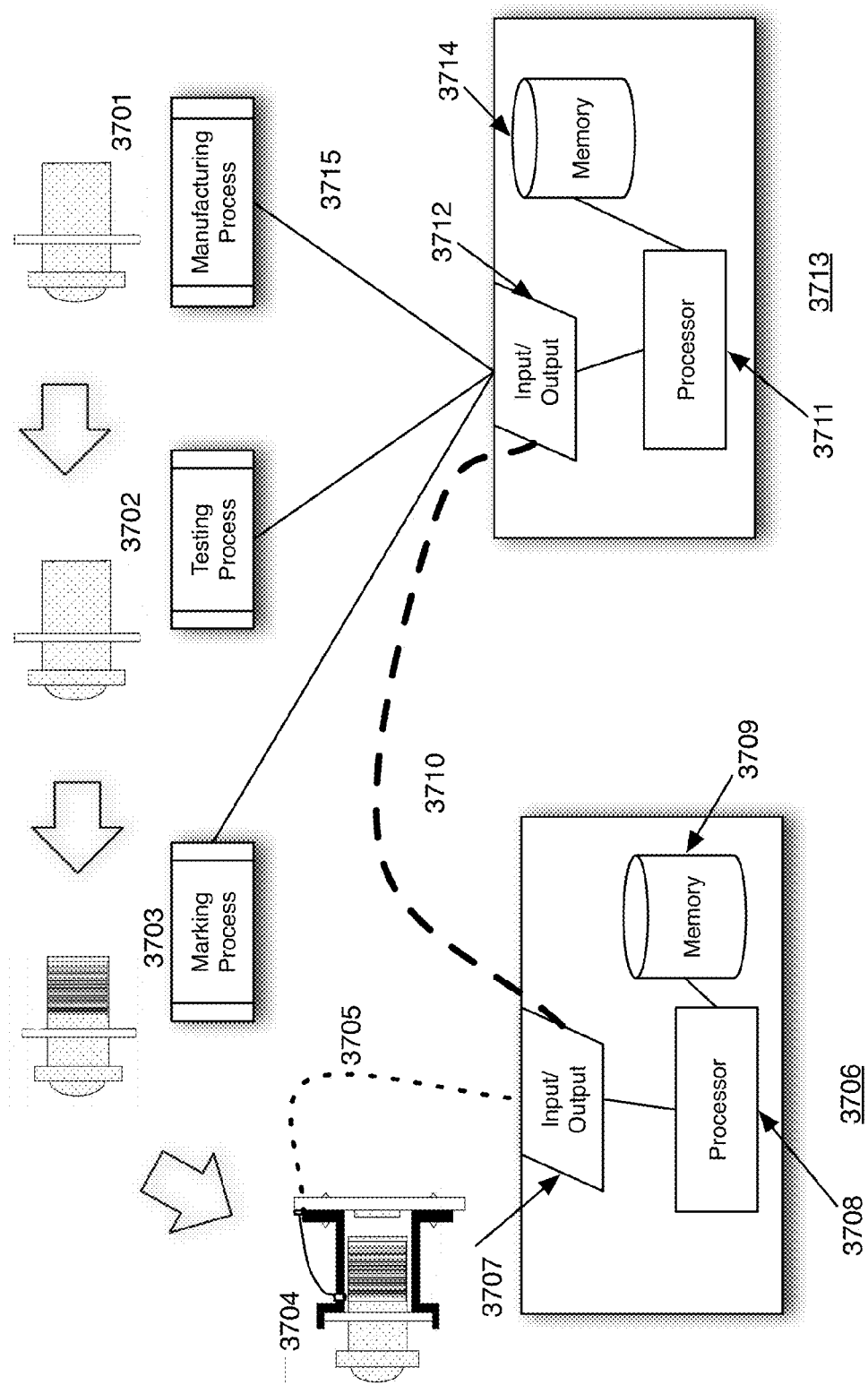
FIG. 37 shows a block diagram of a system for making and using lenses marked for identification.

A block diagram for a system to take advantage of encoded lens bodies is shown in FIG. 37. A lens is first manufactured and placed in a lens body 3701. The lens is then tested using techniques known in the industry that detect lens properties including defects related to variations in the manufacturing process. Exemplary test equipment and testing procedures are those provided by Optikos Corporation of Wakefield, Mass., USA and TriOptics GmbH of Wedel, Germany. The lens body is encoded with a serial number in a marking process 3703. The marking process may take place before testing or after and in one embodiment the marking process is included in the manufacturing process 3701. The marking can be through any of the embodiments already discussed in conjunction with FIGS. 33-36. The lens is then attached to a lens holder either by an end user or prior to being sold or transferred to a user. When inserted in to the lens holder a sensor reads the serial number information. The imaging device associated with the lens body and lens holder includes a computing device 3706. The computing device includes an input output port 3707 and processor 3708 and memory 3709. The computing device 3706 is connected 3705 to the reader on the lens holder. The connection may be by wired or wireless means. In one embodiment the computing device 3706 is further connected 3710 to a second computing device 3713. The second computing device may be a server located on the Internet and the connection may be through a network or through the Internet by means known in the art. The second computing device is connected 3715 to the manufacturing testing and marking processes again through wired or wireless means. The second computing device includes an input/output port 3712 for communication, a processor 3711 and memory 3714. The lens serial number and test results are stored in memory 3714 and when the lens body is inserted in the lens holder the first processor checks for information related to the particular lens inserted as known through the encoded serial number and if information is not available in memory 3709 associated with the first computing device, the processor 3708 of the first computing device is programmed to send a query to the second computing device 3713 and data related to the particular lens is then sent from the second computing device 3713 to the first computing device 3706. The first computing device may then apply corrections to an image acquired based upon test data specific to the particular lens inserted in the lens body. In another embodiment the corrections may be done on a third computing device (not shown) that is electronically linked to the first computing device to obtain an image file and is linked to the second computing device to obtain test data for the lens and then is programmed to apply corrections to the image file received from the first computing device.

Figure 38:
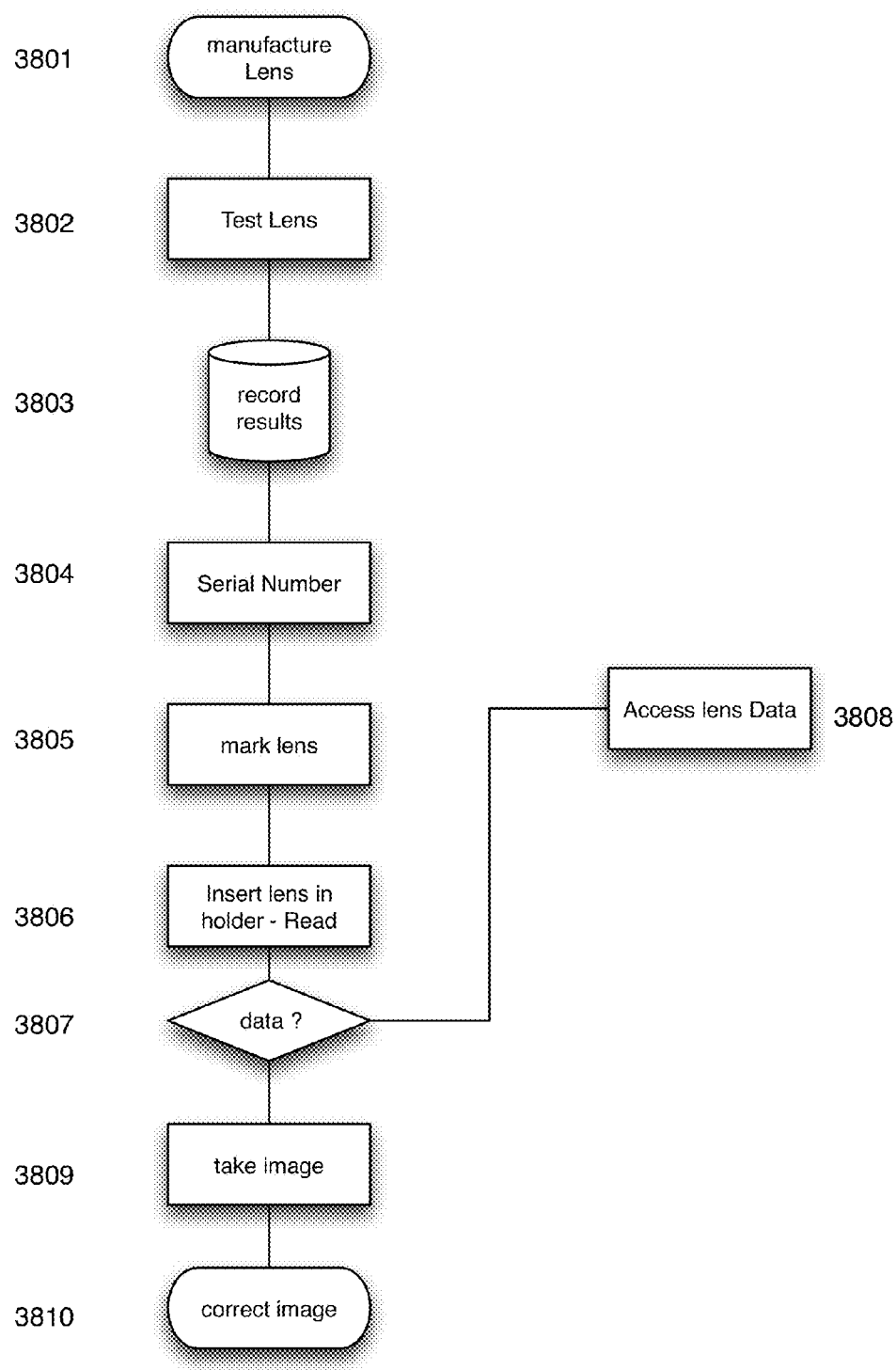
FIG. 38 shows a flow chart for the system of FIG. 37.

FIG. 38 shows a simplified flow chart of a method to apply the corrections as described above. A lens is manufactured 3801 and tested 3802. The results of the test are recorded 3803 and associated 3804 with a serial number specific to the lens and the lens is marked 3805 with the serial number. Marking may be by any of the printing or electrical means as already discussed. The ordering of the steps 3802-3805 may be varied to the same effect. For example the lens may be marked before testing. In use a lens body is inserted 3806 in a lens holder and the serial number of the lens is read. A computing device checks 3807 whether data related to the lens is available and if not accesses 3808 a server that includes a database of lens test data associated with the serial number previously read. The test data and associated correction parameters may then be downloaded to the computing device local to the lens body and lens holder and associated image acquisition sensor. The user then takes an image 3809 and the image is corrected 3810 on the basis of the lens test data. Again the steps 3807-3810 may be re-arranged to the same effect. For example the test for image data available 3807 may take place after the image is acquired. In another embodiment the image is transferred to a third computing device, as discussed in conjunction with FIG. 37, and the third computing device checks for lens test data 3807 and downloads the test data to memory in the third computing device and the image correction takes place on the third computing device that may be located remote from the lens body, lens holder and image sensor.

SUMMARY

A lens mount design is presented. The mount can be used on a variety of imaging systems but is targeted at small camera systems such as might be used on mobile phones, cameras, sports cameras, computers and computer peripherals where interchangeable lenses are currently not common place. Embodiments include different attachment mechanisms, environmental barriers, electrical connections and a serial number marking system on the replaceable lens body. Those skilled in the art will appreciate that various adaptations and modifications of the preferred embodiments can be configured without departing from the scope and spirit of the invention. Therefore, it is to be understood that the invention may be practiced other than as specifically described herein, within the scope of the appended claims.

What is claimed is:

1. A lens mount for attachment to a substrate having an image sensor said image sensor having an image plane, said lens mount comprising:
   a) a cylindrical lens body having a central axis,
   b) lens elements forming a lens, said lens having an optical axis and a focal plane and mounted inside the lens body said optical axis coincident with the central axis of the lens body,
   c) a lens body flange attached to the lens body, said lens body flange having at least one lens body flange reference surface, said lens body flange reference surface is in a predetermined position relative to the focal plane and the optical axis,
   d) a lens holder having an inner cavity said inner cavity sized to receive the lens body,
   e) a lens holder flange,
   f) a lens holder flange reference surface on the lens holder flange, said lens holder reference surface is in a predetermined position relative to the image plane of the said sensor when the lens holder is attached to the substrate,
   g) wherein the lens body is removably attached to the lens holder by insertion of the lens body into the inner cavity of the lens holder such that the lens body flange reference surface and the lens holder flange reference surface mate, and,
   h) when the lens body flange reference surface mates with the lens holder flange reference surface the focal plane of the lens and the image plane of the sensor are aligned, and,
   i) a second reference surface on the lens body and a second reference surface on the lens holder and when the lens body is removably attached to the lens holder by insertion of the lens body into the inner cavity of the lens holder the second reference surfaces also mate and when mated the focal plane of the lens is aligned with the image plane of the sensor in the x, y, z directions and rotations about x, y and z axes where x, y and z describe a Cartesian coordinate system with x along the optical axis, and,
   j) a groove located in the second reference surface on the lens body flange,
   k) a retainer catch located on the lens holder said retainer catch held within the groove by a spring force to prevent removal of the lens body from the lens holder,
   l) a lever actuator located on the lens holder that is hinged such that when the actuator is actuated the catch is pulled away from the groove thereby releasing the lens body from the lens holder for removal.

2. The lens mount of claim 1 wherein the lens body is held in place in the lens holder by a friction fit between the lens body and the lens holder.

3. The lens mount of claim 1 further including a magnet and wherein the lens body is held in place in the lens holder by magnetic attractive forces between the lens body and the lens holder.

4. A lens mount for attachment to a substrate having an image sensor said image sensor having an image plane, said lens mount comprising:
   a) a cylindrical lens body having a central axis,
   b) lens elements forming a lens, said lens having an optical axis and a focal plane and mounted inside the lens body said optical axis coincident with the central axis of the lens body,
   c) a lens body flange attached to the lens body, said lens body flange having at least one lens body flange reference surface, said lens body flange reference surface is in a predetermined position relative to the focal plane and the optical axis,
   d) a lens holder having an inner cavity said inner cavity sized to receive the lens body,
   e) a lens holder flange,
   f) a lens holder flange reference surface on the lens holder flange, said lens holder reference surface is in a predetermined position relative to the image plane of the said sensor when the lens holder is attached to the substrate,
   g) wherein the lens body is removably attached to the lens holder by insertion of the lens body into the inner cavity of the lens holder such that the lens body flange reference surface and the lens holder flange reference surface mate, and,
   h) when the lens body flange reference surface mates with the lens holder flange reference surface the focal plane of the lens and the image plane of the sensor are aligned, and,'
   i) a groove circumscribing an outer surface on the lens body flange,
   j) a retainer catch located on the lens holder said retainer catch removably held within the groove by a spring force to prevent removal of the lens body from the lens holder,
   h) a lever actuator located on the lens holder that is hinged such that when the actuator is activated the catch is pulled away from the groove thereby releasing the lens body from the lens holder for removal.

5. The lens mount of claim 4 wherein the lens body is held in place in the lens holder by a friction fit between the lens body and the lens holder.

6. The lens mount of claim 4 further including a magnet and wherein the lens body is held in place in the lens holder by magnetic attractive forces between the lens body and the lens holder.

* * * * *